US011853405B2

(12) United States Patent
Goldstein et al.

(10) Patent No.: US 11,853,405 B2
(45) Date of Patent: Dec. 26, 2023

(54) METHODS AND SYSTEMS FOR A VOICE ID VERIFICATION DATABASE AND SERVICE IN SOCIAL NETWORKING AND COMMERCIAL BUSINESS TRANSACTIONS

(71) Applicant: Staton Techiya LLC, Lighthouse Point, FL (US)

(72) Inventors: Steven Goldstein, Delray Beach, FL (US); John Patrick Keady, Fairfax Station, VA (US)

(73) Assignee: Staton Techiya LLC, Delray Beach, FL (US)

( * ) Notice: Subject to any disclaimer, the term of this patent is extended or adjusted under 35 U.S.C. 154(b) by 273 days.

(21) Appl. No.: 17/464,203

(22) Filed: Sep. 1, 2021

(65) Prior Publication Data

US 2021/0397690 A1 Dec. 23, 2021

Related U.S. Application Data

(63) Continuation of application No. 16/886,776, filed on May 29, 2020, now Pat. No. 11,170,089, which is a continuation-in-part of application No. 16/356,542, filed on Mar. 18, 2019, now abandoned, which is a continuation of application No. 14/466,943, filed on Aug. 22, 2014, now Pat. No. 10,235,509.

(Continued)

(51) Int. Cl.
*G06F 21/32* (2013.01)
*G06F 16/635* (2019.01)
*H04W 4/21* (2018.01)
*G06F 16/683* (2019.01)
*H04L 9/40* (2022.01)
*G10L 17/04* (2013.01)

(52) U.S. Cl.
CPC ............ *G06F 21/32* (2013.01); *G06F 16/636* (2019.01); *G06F 16/683* (2019.01); *H04L 63/0861* (2013.01); *H04W 4/21* (2018.02); *G10L 17/04* (2013.01)

(58) Field of Classification Search
CPC .............................. G06F 21/32; G06F 16/683
See application file for complete search history.

(56) References Cited

U.S. PATENT DOCUMENTS

| 3,876,843 A | 4/1975 | Moen |
| 4,054,749 A | 10/1977 | Suzuki et al. |

(Continued)

FOREIGN PATENT DOCUMENTS

| CN | 103218198 | 12/2016 |
| CN | 110650401 | 1/2020 |

(Continued)

OTHER PUBLICATIONS

Olwal, A. and Feiner S. Interaction Techniques Using Prosodic Features of Speech and Audio Localization. Proceedings of IUI 2005 (International Conference on Intelligent User Interfaces), San Diego, CA, Jan. 9-12, 2005, p. 284-286.

(Continued)

*Primary Examiner* — Ibrahim Siddo
(74) *Attorney, Agent, or Firm* — Akerman LLP; Peter A. Chiabotti

(57) ABSTRACT

Devices and methods to track contact between persons using acoustic voiceprint identification from stored audio signals are presented herein.

15 Claims, 11 Drawing Sheets

Related U.S. Application Data

(60) Provisional application No. 61/868,792, filed on Aug. 22, 2013.

(56) References Cited

U.S. PATENT DOCUMENTS

| | | | |
|---|---|---|---|
| 4,088,849 A | 5/1978 | Usami et al. |
| 4,947,440 A | 8/1990 | Bateman et al. |
| 5,208,867 A | 5/1993 | Stites, III |
| 5,267,321 A | 11/1993 | Langberg |
| 5,524,056 A | 6/1996 | Killion et al. |
| 5,777,571 A | 7/1998 | Chuang |
| 5,903,868 A | 5/1999 | Yuen et al. |
| 6,021,207 A | 2/2000 | Puthuff et al. |
| 6,021,325 A | 2/2000 | Hall |
| 6,163,338 A | 12/2000 | Johnson et al. |
| 6,163,508 A | 12/2000 | Kim et al. |
| 6,226,389 B1 | 5/2001 | Emelson et al. |
| 6,298,323 B1 | 10/2001 | Kaemmerer |
| 6,359,993 B2 | 3/2002 | Brimhall |
| 6,400,652 B1 | 6/2002 | Goldberg et al. |
| 6,415,034 B1 | 7/2002 | Hietanen |
| 6,424,946 B1 | 7/2002 | Tritschler |
| 6,567,524 B1 | 5/2003 | Svean et al. |
| 6,567,775 B1 | 5/2003 | Maali |
| RE38,351 E | 12/2003 | Iseberg et al. |
| 6,661,901 B1 | 12/2003 | Svean et al. |
| 6,728,385 B2 | 4/2004 | Kvaloy et al. |
| 6,748,238 B1 | 6/2004 | Lau |
| 6,754,359 B1 | 6/2004 | Svean et al. |
| 6,804,638 B2 | 10/2004 | Fiedler |
| 6,804,643 B1 | 10/2004 | Kiss |
| 7,072,482 B2 | 7/2006 | Van Doorn et al. |
| 7,107,109 B1 | 9/2006 | Nathan et al. |
| 7,203,651 A2 | 4/2007 | Baruch |
| 7,203,721 B1 | 4/2007 | Ben-Efraim |
| 7,209,569 B2 | 4/2007 | Boesen |
| 7,430,299 B2 | 9/2008 | Armstrong et al. |
| 7,433,714 B2 | 10/2008 | Howard et al. |
| 7,450,730 B2 | 11/2008 | Bertg et al. |
| 7,477,756 B2 | 1/2009 | Wickstrom et al. |
| 7,562,020 B2 | 7/2009 | Le et al. |
| 7,672,845 B2 | 3/2010 | Beranek |
| 7,756,285 B2 | 7/2010 | Sjursen et al. |
| 7,778,434 B2 | 8/2010 | Juneau et al. |
| 7,920,557 B2 | 4/2011 | Moote |
| 8,014,553 B2 | 9/2011 | Radivojevic et al. |
| 8,140,340 B2 | 3/2012 | Bhogal |
| 8,391,445 B2 | 3/2013 | Hoblit |
| 8,493,204 B2 | 7/2013 | Wong et al. |
| 8,750,295 B2 | 6/2014 | Liron |
| 8,788,256 B2 | 7/2014 | Chen |
| 8,862,393 B2 | 10/2014 | Zhou et al. |
| 8,971,854 B2 | 3/2015 | Addy |
| 9,037,458 B2 | 5/2015 | Park et al. |
| 9,123,343 B2 | 9/2015 | Kurki-Suonio |
| 9,135,797 B2 | 9/2015 | Couper et al. |
| 9,251,787 B1 | 2/2016 | Hart |
| 9,262,612 B2 | 2/2016 | Cheyer |
| 9,275,639 B2 | 3/2016 | Shagalov |
| 9,418,664 B2 | 8/2016 | Addy |
| 9,558,749 B1 | 1/2017 | Secker-Walker |
| 9,691,377 B2 | 6/2017 | Gunn |
| 9,711,148 B1 | 7/2017 | Sharifi |
| 2001/0046304 A1 | 11/2001 | Rast |
| 2002/0106091 A1 | 8/2002 | Furst et al. |
| 2002/0118798 A1 | 8/2002 | Langhart et al. |
| 2003/0044050 A1* | 3/2003 | Clark .............. H04L 63/0861 |
| | | 340/5.82 |
| 2003/0161097 A1 | 8/2003 | Le et al. |
| 2003/0165246 A1 | 9/2003 | Kvaloy et al. |
| 2004/0042103 A1 | 3/2004 | Mayer |
| 2004/0109668 A1 | 6/2004 | Stuckman |
| 2004/0125965 A1 | 7/2004 | Alberth, Jr. et al. |
| 2004/0190737 A1 | 9/2004 | Kuhnel et al. |
| 2004/0196992 A1 | 10/2004 | Ryan |
| 2004/0203351 A1 | 10/2004 | Shearer et al. |
| 2005/0078838 A1 | 4/2005 | Simon |
| 2005/0123146 A1 | 6/2005 | Voix et al. |
| 2005/0288057 A1 | 12/2005 | Lai et al. |
| 2006/0067551 A1 | 3/2006 | Cartwright et al. |
| 2006/0083395 A1 | 4/2006 | Allen et al. |
| 2006/0092043 A1 | 5/2006 | Lagassey |
| 2006/0195322 A1 | 8/2006 | Broussard et al. |
| 2006/0204014 A1 | 9/2006 | Isenberg et al. |
| 2007/0043563 A1 | 2/2007 | Comerford et al. |
| 2007/0086600 A1 | 4/2007 | Boesen |
| 2007/0189544 A1 | 8/2007 | Rosenberg |
| 2007/0291953 A1 | 12/2007 | Ngia et al. |
| 2008/0037801 A1 | 2/2008 | Alves et al. |
| 2008/0165988 A1 | 7/2008 | Terlizzi et al. |
| 2009/0010456 A1 | 1/2009 | Goldstein et al. |
| 2009/0024234 A1 | 1/2009 | Archibald |
| 2010/0061564 A1 | 3/2010 | Clemow et al. |
| 2010/0296668 A1 | 11/2010 | Lee et al. |
| 2011/0096939 A1 | 4/2011 | Ichimura |
| 2011/0264447 A1 | 10/2011 | Visser et al. |
| 2011/0293103 A1 | 12/2011 | Park et al. |
| 2013/0214901 A1* | 8/2013 | Pineau .................. G06F 21/32 |
| | | 340/5.61 |
| 2016/0104452 A1 | 4/2016 | Guan et al. |
| 2020/0302452 A1 | 9/2020 | Platt et al. |

FOREIGN PATENT DOCUMENTS

| | | |
|---|---|---|
| EP | 1519625 A2 | 3/2005 |
| WO | 2006037156 A1 | 4/2006 |

OTHER PUBLICATIONS

Bernard Widrow, John R. Glover Jr., John M. McCool, John Kaunitz, Charles S. Williams, Robert H. Hearn, James R. Zeidler, Eugene Dong Jr, and Robert C. Goodlin, Adaptive Noise Cancelling: Principles and Applications, Proceedings of the IEEE, vol. 63, No. 12, Dec. 1975.

Mauro Dentino, John M. McCool, and Bernard Widrow, Adaptive Filtering in the Frequency Domain, Proceedings of the IEEE, vol. 66, No. 12, Dec. 1978.

* cited by examiner

METHODS AND SYSTEMS FOR A VOICE ID VERIFICATION DATABASE AND SERVICE IN SOCIAL NETWORKING AND COMMERCIAL BUSINESS TRANSACTIONS

CROSS-REFERENCE TO RELATED APPLICATIONS

This application is a continuation of and claims priority to U.S. patent application Ser. No. 16/886,776 filed 29 May 2020, which is a continuation in part of and claims priority to U.S. patent application Ser. No. 16/356,542 filed 18 Mar. 2019, which is a continuation of and claims priority to U.S. patent application Ser. No. 14/466,943 filed Aug. 22, 2014, which claims the priority benefit of U.S. Provisional Patent Application No. 61/868,792 filed on Aug. 22, 2013, the disclosures of which are incorporated herein by reference in their entireties.

FIELD OF THE INVENTION

The present embodiments herein disclosed generally refer to methods and systems for voice identification and verification in conjunction with social networking and social media.

BACKGROUND OF THE INVENTION

The term voice recognition or speaker identification refers to finding the identity of "who" is speaking, rather than identifying the content of what they are saying. Recognizing the speaker can simplify tasks of translating speech in systems that have been trained on a specific person's voice or it can be used to authenticate or verify the identity of a speaker as part of a security process.

Speech signals include information about the creator of the speech; that is, the person talking. Modem technology known as Speaker ID or Voice Verification can identify the speaker as one of a moderate collection of speakers, or can verify a claimed identity, in a short segment of speech or a collection of such segments. The requirement for such an identification process is that the speech of the person to be identified is available independently of the message.

Biometrics refers to metrics related to human characteristics and traits. Biometric identification (or biometric authentication) is used in computer science as a form of identification and access control based on human characteristics and traits. It is also used to identify individuals in groups that may be monitored or under surveillance. Biometric identifiers are the distinctive, measurable characteristics used to label and describe individuals. Biometric identifiers are often categorized as physiological versus behavioral characteristics.

Whether at business related events (e.g. trade shows, meetings, conferences) or social gatherings (e.g. wedding receptions, party celebrations), situations often arise where people meet for the first time or cannot remember the names of participants they have met before or would like to have more background information of their conversation partners. A need for voice identification in such situations exists, including private use cases, commercial business transactions and government use cases.

DETAILED DESCRIPTION

Figure 1:
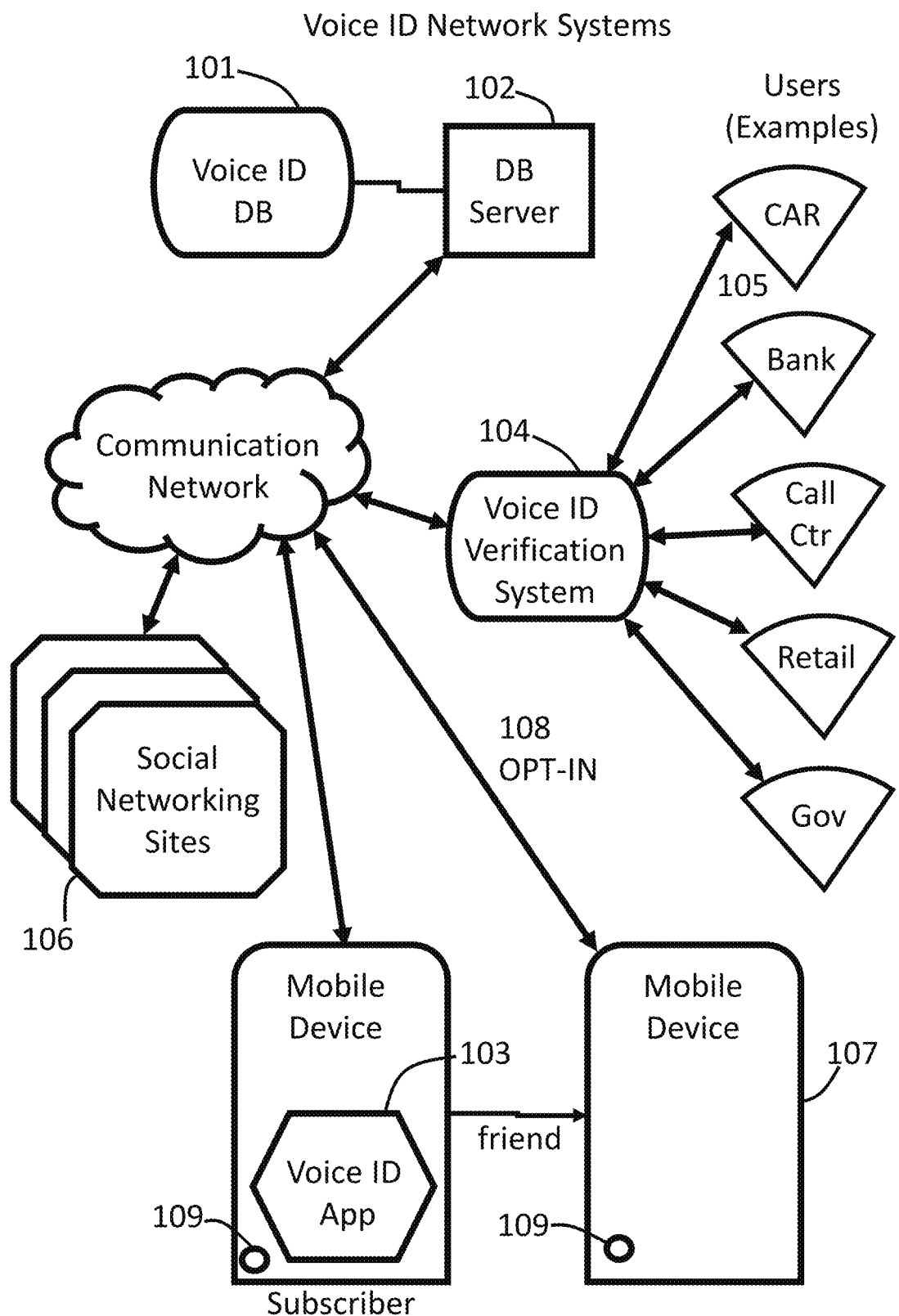
FIG. 1 depicts Voice-ID network functions in accordance with an exemplary embodiment.

The following descriptions of exemplary embodiments are merely illustrative in nature and are in no way intended to limit the embodiments herein, its application, or uses.

Processes, techniques, apparatus, and materials as known by one of ordinary skill in the relevant art may not be discussed in detail but are intended to be part of the enabling description where appropriate, for example the fabrication and use of transducers.

In all of the examples illustrated and discussed herein, any specific values, for example the sound pressure level change, should be interpreted to be illustrative only and non-limiting. Thus, other examples of the exemplary embodiments could have different values.

Note that similar reference numerals and letters refer to similar items in the following figures, and thus once an item is defined in one figure, it may not be discussed for following figures.

Some of the embodiments herein disclosed generally refer to methods and systems for voice identification (ID) and verification in conjunction with social networking and social media for private use cases, commercial business transactions and government use cases.

FIG. 1 illustrates a realization of the Voice-ID network system 100 according to an embodiment of the present embodiments. As shown in FIG. 1, the components of the Voice-ID network include:

a voice identifier database 101 that contains the Voice IDs of opted in Voice-ID network subscribers, a database server 102 that controls the opt-in procedure, a voice ID App 103 that is installed on a mobile device delivers visual profile information about people in the vicinity of the device and controls the recording and delivery of voice samples to create voice prints for the OPT-In procedure, a social media application (e.g., social networking sites) 106 to communicate with other people that in conjunction with the voice identifier database 101 identities other participants made available via the web or other interconnection means, An ID Verification Service System 104 that provides an interface to a multitude of users in need of ID verification 105

At least one mobile device 107 having a microphone 109 and providing an established social media connection (e.g., friend) to the voice ID App 103

The Voice IDs stored in the voice identifier database 101 are also referred to as voice prints or voiceprints. The voiceprint is an efficient distillation of the speech of a talker which contains information about his or her identity, but which does not necessarily contain information about the content of the speech used to make the voiceprint. The voice prints include 1) a voice sample, for example, a spoken utterance, or phrases, digitally captured and stored on media, 2) a profile associated with the voice sample (described below), and optionally 3) device specific information, for example, a global positioning system (GPS) location, a Wi-Fi network, a MAC address, an IP address, and a unique device identifier, such as provided by the mobile device running the voice ID App 103.

The profile can include information such as a name, email address, identification number, IP address, vehicle registration plate number, driver's license number, biometric data, face, iris print, fingerprints, or handwriting, credit card numbers, digital identity, date of birth, birthplace, genetic information, telephone number, login name, screen name, nickname, or handle, country, state, or city of residence, age, gender, race, name of a school attended, name of workplace, location of workplace, grades, salary, or job position, or criminal record. The aforementioned list of profile information is not meant to be exhaustive and only provides a sample of the types of information that can be used in the embodiments herein. As discussed later, such profile information can be used to corroborate an identity.

In the modem collection of algorithms for analyzing audio and speech signals, one aspect of the embodiments is a method to identify the talker of any particular utterance, independent of the information contained in the transcription of that utterance. That is, the talker is identified on only the characteristics of that person's voice, and not on the content or phrase of a spoken utterance. Also, in face-to-face interactions with other people the method described herein identifies information about the people whose voice are captured and/or engaging in a spoken interchange (There might be a mix of people, for instance in a conference room which includes people on a speaker phone, or in a conference setting with some people at a remote site). The Voice-ID network system of FIG. 1 obtains in near real-time the ID, profile and personal information of individuals merely by capturing their voice prints. This greatly enhances the ability for people to socialize and interact in a variety of situations.

Another aspect of the embodiments is the building and updating of a large and secure voice identifier database 101 of voice prints through the utilization of social media, and further incorporating the voice prints to enable enhanced social media value and security. Once configured, this database allows for a novel ID verification service based on capturing voice samples that benefits a multitude of users ranging from financial institutions to the control of set top boxes and vehicle access, to name a few. The large scale building up of the voice ID entries and the voice identifier database 101 is further achieved through the exploitation of contact and friends lists that are part of social networking. Voice identification is performed through a profile searching of social media. This efficient searching identifies voice samples of unknown talkers through access of contact or friends lists of a device used to capture the voice samples associated with a user of the device by way of the voice print.

As an example, law enforcement would benefit tremendously from having the ability to verify the identity of a person based on the person's voice sample. For instance, Police interviewing a driver during a routine traffic stop may use the driver's license and registration to direct the network to a stored voiceprint, for which the officer can validate if it is or isn't the driver as shown on their documents. In order to support this capability, a large database of voice prints would be required to make this procedure practical as a standard law enforcement routine. Further, this embodiment may contribute to Homeland Security and ecommerce in providing voice identification and verification services leveraging a large voice print database.

Figure 2:
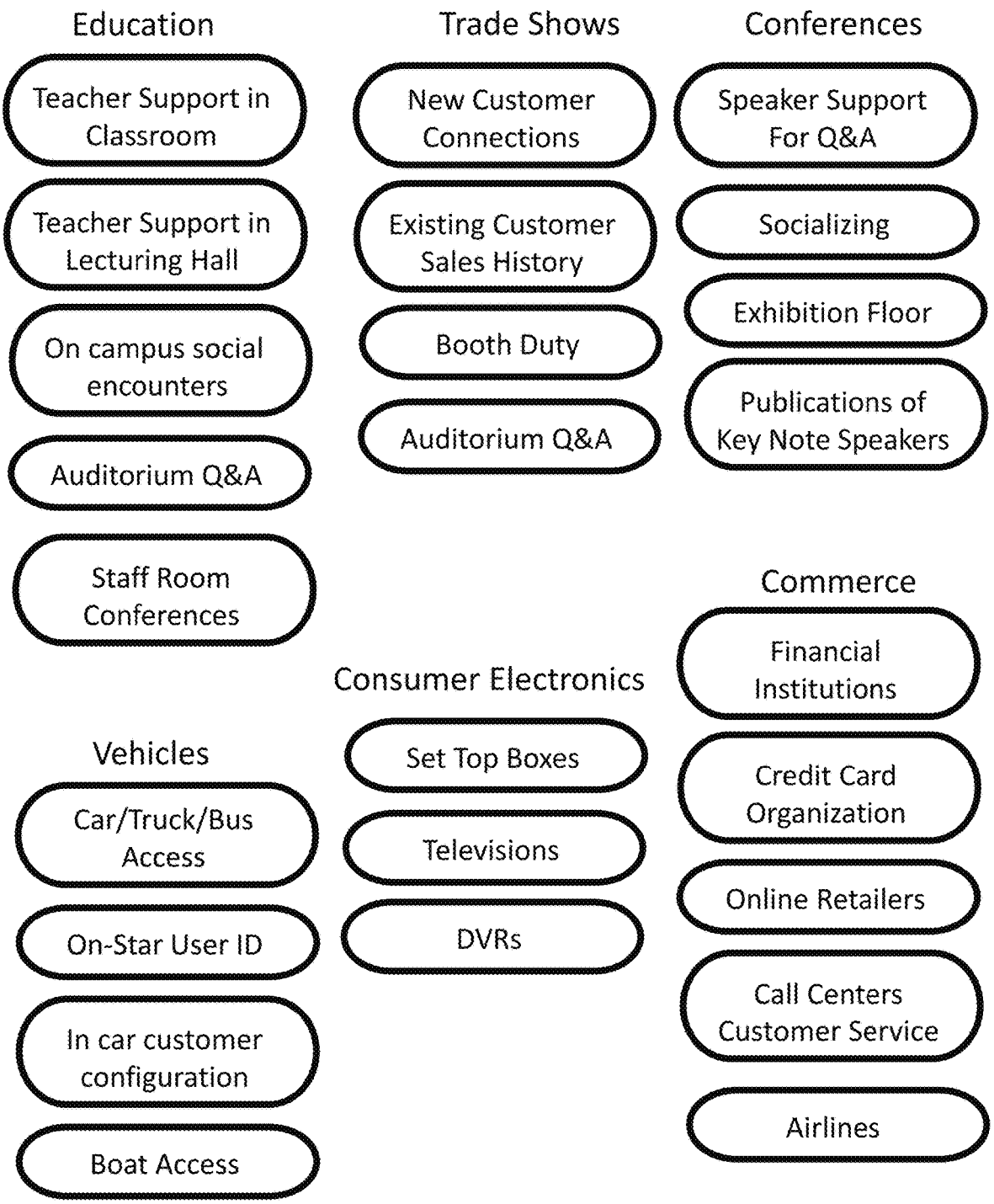
FIG. 2 depicts a set of use case examples in accordance with an exemplary embodiment.

FIG. 2 illustrates examples of potential users and use cases of the Voice-ID Network according to an embodiment herein. As shown in FIG. 2, the example areas of use include but are not limited to:

Education
Trade Shows
Conferences
Commerce
Consumer Electronics
Vehicles

In one embodiment, the Voice-ID network system 100 of FIG. 1 performs a method of voice identification and validation. For exemplary purposes, the method can be practiced individually, or in combination, by the voice ID App 103 and/or the database server 102. In a first step, the method registers one or more users on a social media platform with login information during a social media session (also referred to as 'social media'). The social media means a friend list, a contact list, an email account, a text message history, a call history, an internet search history, a conference event, a community organization, a social network, a social networking application, an on-line data repository, a social application, social software or social program, though not limited to these. For example, a user of the mobile device runs the voice ID App 103 while also running a social media session, for example, Facebook, Twitter, Instagram, or other social networking site. The voices ID App 103 can alternatively be integrated within the social media session, for example, as an add-on, plug in or download. The login information the user enters into the social media session can also be captured by the voice ID App 103. Alternatively, if privacy is enabled, the user can also manually enter the login information to the voice ID App 103.

In a following step, a voice sample is acquired at any time of the social media session, or a continuation of the social media session. For example, upon logging into the social media session, the user may be prompted to provide a voice sample, a spoken utterance by the user. The user may do this during the login, or at a later time, whether logged into the social media session or with the voice ID App 103 with or without the same device previously used in the social media session. Although not required, the spoken utterance may include speech specific content for example, a personal phrase, the user may recall and that can be used to further identify the user. The voice sample is digitally stored to the mobile device and/or uploaded to the database server 102.

In a following step, the login information and the voice sample are associated in a profile for each of the one or more users. This association may be performed on the mobile device and/or on the database server 102. Thereafter, the profile is stored as a voice print in a voice print identifier database by the database server 102. In the optional case where device specific information is captured from at least one device used during the social media session to capture the voice sample, the login information, the voice print and the device specific information are associated in the profile for each of the one or more users.

Once the registration is complete and the voice print is created specific to the user, that voice print may be referenced by voice ID opt-in subscribers to identify the user from an interfacing of the social media platform with the voice print identifier database. The interfacing between the social media platform and the voice print identifier means a matching or correlating of profiles or data entries in profiles that include voice samples with information from data points in social media from the social media platform. The data points may be any of the device specific information available to the mobile device on which the social media is running or any data provided with the registering or login to the social media. The interfacing also includes the conduct of the searching in the voice identifier database 101, for example, by the voice APP 103 accessing contact and friends lists to corroborate data between profiles and other devices 107 for prioritizing a list of voice prints in the voice identifier database 101.

The opt-in subscribers are those individuals that have entered into a service for the voice ID App 103 or other affiliation. When a sufficiently large population of voice prints are stored in the database server 102, a multitude of different users that are opted into (subscribed) the voice ID system can then retrieve the voice prints, for example, by way of contact and friends lists to identify one or more talkers. This includes other opt-in users on other mobile devices 107. One novel aspect is that the user by way of the voice ID App 103 can elect for opt-in use of that user's contact list and friend list and other social connectivity data to enhance searching in the voice identifier database and amongst the other mobile devices 107. This allows other opt-in users to narrow a search for a talker's voice print by first using the contact and friends list to check for voice print matches.

A user can thereafter launch the voice ID App 103 on their mobile device to identify other talkers in proximity to the mobile device whose voice samples can be captured from a microphone 109 on the mobile device and who may share common interests. For example, at an organized event, such as a concert, a conference, a venue, an auditorium, or other locale at which people are present for common reasons or shared interests, the user may see someone they recognize but cannot recall their name or information, for instance, where they live, what they do as a profession, activities, etc. Given that both the user and the unidentified talker are in proximity possibly because of common reasons (e.g., school meeting, neighborhood committee, local grocery store, sports event, etc.) there is a likely chance that they share similar information (e.g., kids at same school, neighborhood address, same interests, etc.).

A unique aspect of the method herein described is to narrow a search of the voice print for the voice sample to potential voice print candidates that share similar information, such as that in the profile or the device specific information noted above. The searching can also include searching contact and friends lists on established connections to nearby devices, for instance, the other mobile devices 107. The voice ID App 103 can access a contact or friend list associated with the talker, and narrow down a searching extent for confirming an identity of the talker from the contact or friend list. Furthermore, it can modify an access control to the device (103 or 107) responsive to detecting and verifying a talker, including but not limited to, automatically changing and entering log in credentials, account information, device controls, or personal preferences. For example, a user not using their device but rather using a friend's device can log into their social media account using the friend's phone through the voice ID App 103 that upon recognizing the talkers voice, logs into the social media with the login information from the profile of the recognized talker.

As part of the identification of the at least one talker, the login information from the profile for the user by way of the voice ID App 103 accesses the social media and searches for established connections to the voice print identifier database. In this way, the voice identification is first performed on voice prints that are most probable, through established social media connections, to be a person the user knows. An established connection is one in which two or more people are able to view at least a portion of each other's public information; for example, but not limited to, common connections, social groups, interests, records, websites, postings, etc. They may also have a connection status of associate, acquaintance, friend, etc. This avoids requiring the database server to blindly search all voice prints for matches of an unknown voice sample, and thus scales down the search to a smaller sample space; namely, to those most likely through social connections. Of course, other data parameters in a profile can be used to scale down or narrow down a search.

The searching also includes corroborating the profile with the social media to validate an identity of the at least one talker. The profile may also include the device specific information, for example, if captured with a device having the microphone of which was used to capture the voice sample. The voice ID App 103 retrieves the profiles corresponding to the device from the device specific information, or corresponding to a user of the device from the login information, to narrow a searching extent of the voice print stored in the voice identifier database when accessing the social media. For example, information in the profile, such as a favorite activity like tennis is evaluated against similar social information in the unidentified talker. So, if the user is at a tennis match, the method takes the GPS location information (device specific information), queries social media to corroborate that a tennis tournament is occurring in the area, it then looks up the user's friend or contact list to see if others have social tennis interests, and prioritizes the search of voice prints for those identifies with same social tennis interests.

It may also extend the searching to the other mobile devices 107 in proximity whose user's are opted into the voice ID App 103 service. This is merely one example. In another case a user may register on-line at a particular date for a speaking forum, and when the user attends the forum for the event, and upon initiating a voice capture of an unknown person speaking at the event, the voice ID App 103 checks the users GPS location to corroborate that the user is indeed at the registered event, and then accesses social media to further corroborate that the event is taking place and upon so requests an attendee list from the registration, it then narrows down the searching to prioritize established social media connections determined between the user and registered guests on the list. Similarly, it may also extend its searching to the other devices 107 in proximity whose user's are opted into the voice ID App 103 service to corroborate social connections and individual identification.

The voice ID App 103 then compares the voice sample of the at least one talker with the voice prints of the profiles for the established connections in the voice print identifier database 101 to determine a match to an identified talker. Upon detecting a voice sample match to a voice print, the voice ID App 103 responds with at least a portion of the profile of the identified talker. For instance, in the continuing example, the user at the event upon capturing an unidentified talker's voice in proximity is visually presented with the talker's identify (if a match was found), for instance, their name, profession, and other information, for example, public or permitted data such as address, common interests, and the established connection (e.g., friends on facebook, etc.). Moreover, the Voice-ID network system of FIG. 1 by way of the voice ID App 103 and the other mobile devices 107 can capture multiple voices from multiple talkers within vicinity of a mobile device or over a social network, and present an indication of the identity of some or all of the multiple talkers, including but not limited to, a name, background or contact information of the talkers. This extends to events comprising multi-call, multi-conference, video call, group call, multiple person events, speaking engagements or interactive video, and presenting identification of all identified parties participating in the event.

By way of the Voice-ID network system of FIG. 1, the convergence of social media interactivity and the ability of speaker identification/verification systems offers a unique capability to deliver talker specific information to the listener in many situations. This information can be delivered via visual display, on a cell phone, computer notebook or pad, or computer, or via audio link with particularly informative speech phrases or other identifiers. (In fact, information might be delivered with tactile displays such as back-mounted or hand mounted transformational displays). The information can be of two types: 1) For any person involved in the discussion, one might ask to receive the name, location, phone number, and any other available personal information about that person during the discussion. The parameters of the presentation, including frequency of display and information requested, would be part of a profile of the listener associated with either his persona or the device(s) which he is listening/watching or both, and 2) for any person involved in the discussion, if his or her personal information is not available, one might display an indicator that indicates that he or she is speaking "again", that is, that he or she has been heard before, and that this person can be identified as to when they spoke, what they said, where they spoke, or other helpful information about this person's interchange.

Figure 3:
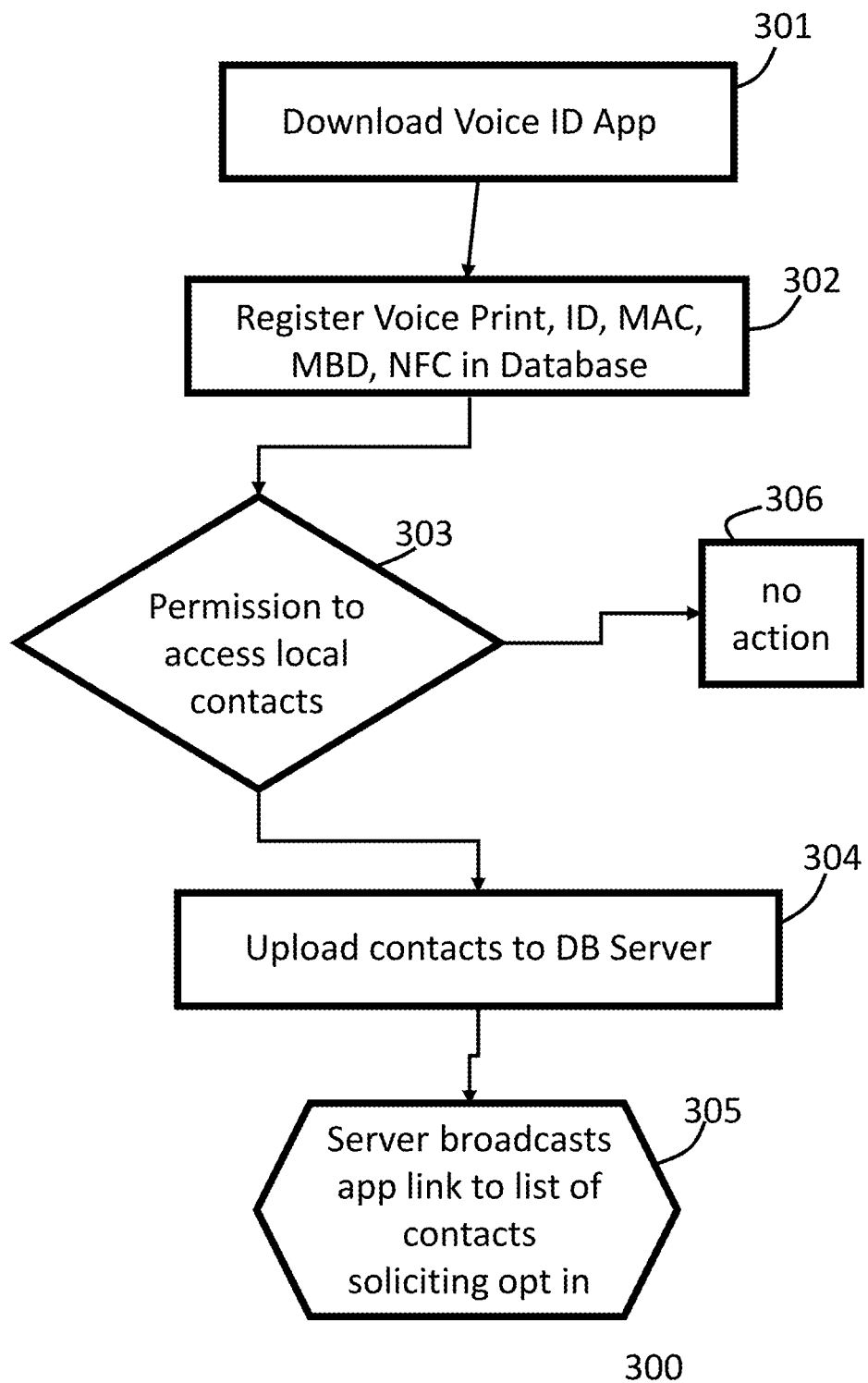
FIG. 3 depicts a method of Voice-ID Database entry acquisition in accordance with an exemplary embodiment.

FIG. 3 illustrates an embodiment of a specific method 300 for acquiring entries for the Voice-ID Database; namely, an acquisition method of database voice ID entries (also voice prints) is based on the exploitation of contact and friend lists collected from social networking sites. The method can start in a state where a user desires to opt into the voice ID application, and is on a mobile device running the voice ID app 103. Once a user has downloaded the VOICE-ID application (301) he or she may be requested to register with the VOICE-ID database and provide a voice sample along with other profile data such as but not limited to a password, caller ID, and/or other social data. (302) Subsequently the user may be asked to allow access to their social networking data (303) including their contact/friends lists. If access is not granted, then no action is taken at 306. If access is granted (which is expected to be a typical response), the VOICE-ID application may upload (304) the contact information to a database server, which in turn may send out social media advertisement messages to the acquired contacts (305) with the VOICE-ID application and its Earcon attached, soliciting their opt-in into the VOICE-ID network. This cycle of contact acquisition and advertisement campaign may repeat itself until a natural saturation of the population is reached. By then it is expected that the VOICE-ID database may have acquired a large number of entries of VOICE-ID network participants. In addition to exploiting social media contact lists, database entries could be provided through other sources such as but not limited to law enforcement agencies, educational institutes, or gaming applications and associated networks.

The opt-in method, i.e. the acquisition method of database entities is based on the exploitation of contact and friend lists that are often used in social networking sites. Once a user has downloaded the VOICE-ID application 103, he or she may be requested to register with the VOICE-ID database and provide a voice sample along with other profile data such as but not limited to a password, caller ID, and/or social data. Subsequently the user may be asked to allow access to their social networking data including their contact/friends lists. If access is granted (which is expected to be a typical response) the VOICE-ID application may upload the contact information to a database and server, which in turn may send out social media advertisement messages to the acquired contacts with the VOICE-ID application attached (an Earcon may alert the user), soliciting their opt-in into the VOICE-ID network. This cycle of contact acquisition and advertisement campaign may repeat itself until a natural saturation of the population is reached. By then it is expected that the VOICE-ID database may have acquired a large number of entries of VOICE-ID network participants.

In some embodiments, the VOICE-ID database is encrypted and access is secured via state of the art access methods. In addition to the voice ID, the profile data for an individual may contain a password, the MAC address of the device used for the voice recording along with its Near field communication (NFC) data, Wi-Fi, IP address, device unique address, physical hardwired location, GPS, Caller ID, Fingerprint, Face Print, as well as any form of multimodal biometric identification (MBI) data. In addition to the VOICE-ID application, potential users of this verification database may include but not necessarily limited to the Education System, Banks, Credit Card Organizations, Government, Internet online retail sites, enterprise customer service, call centers, and the like.

The VOICE-ID application 103 typically may reside on a smart communication device such as !PHONE, ANDROID, Microsoft Windows, IOS, or RIM based devices, desktop computers, GPS devices, or embedded along with on-board computers in automobiles. It can react to voice signals in its proximity and obtain and present the associated user's profile data on the device such as but not limited to the users name, family data, profession, last contact, interests, hobbies, business ownership, and similar or any other test, graphic, metadata, video, audio or other data. Being in a conference room, a meeting, a tradeshow, a reception or party, the VOICE-ID application may pick up on the surrounding voices, or ambient sounds containing spoken utterances, and provide information about social contacts in near-real-time. Individuals whose voices are captured in near proximity to a device (having a microphone) who are registered subscribers to the VOICE-ID application that have an existing voice print or profile on the Voice ID database will obviously provide a quick result in being identified. Individuals whose voices are capture in near proximity to the device who are unregistered may or may not be recognized. If it is a new voice that is captured, a temporary identifier can be given and some limited form of tracking can be done with the new voice and the associated talker. In a classroom and lecturing hall, the teacher can obtain a wealth of information for the students with whom he or she has a conversation, right at his or her fingertips. In some embodiments or scenarios, entering a voice print can be a prerequisite for participating in a class, thereby populating a VOICE-ID database.

Use case examples for the use of the Voice-ID Network may include but are not limited to: teachers of the education system who want near-real-time profile data for the students they have a verbal exchange with; sales representatives in trade shows who want up-to-date information for potential customers; speakers in trade shows when asked questions from the audience; at social gatherings and parties to obtain identity and profile information about conversation partners; at business meetings to obtain identity and detailed profile information about conversation partners; ID verification of telephone customers for financial institutions; ID verification for cars to validate access to the vehicle and to control user specific functions of the vehicle; ID verification for building technology to validate access to buildings and to control user specific functions in the building; ID verification in online voice and video communications; or ID verification for Police and Military The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived there from, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

For example, the methods and systems disclosed herein can be extended to build a database (VOICE-ID-database) that contains secured and encrypted voice ID and other profile data for opted-in individuals, an acquisition method for such voice IDs and other profile data for individuals through the use of social networking capabilities, an ID verification system that is used both in social networking as well as in commercial transactions to deliver the ID of humans based on their voice samples, and a mobile application (VOICE-ID app) to facilitate the recording and translation of voice samples into voice ID data and profile data for the individual recorded, and which provides a visual representation of the data obtained. In contrast to existing social media capabilities the embodiments herein provide for the ability to obtain near-real-time information about people who are in close (voice distance) proximity of a communication device that has loaded the aforementioned voice ID application. The combination of the above referenced methods and systems are referred in the following as the VOICE-ID Network. Further note that the VOICE-ID application can obtain such real-time information from not only a single talker in close proximity to a device (having a microphone), but from multiple talkers or voices that are being heard directly or indirectly by the device. The voice or voices captured for comparison with an existing voice print or existing voice prints on the VOICE-ID database can be part of a directed conversation or can also be part of a voice being heard in an ambient space in relative close proximity to the device (that is not necessarily in a directed conversation with the user of the device).

In some embodiments, a method for voice identification and validation can include the steps of registering one or more users on a social media platform with login information during a social media session, acquiring a voice sample at any time of the social media session or a continuation of the social media session, associating the login information and the voice sample in a profile for each of the one or more users, and storing the profile as a voice print in a voice print identifier database. The method can further include the step of identifying at least one talker from an interfacing of the social media platform with the voice print identifier database.

In some embodiments, the step of identifying the at least one talker includes capturing, with a device equipped with a microphone and communicatively coupled to the social media platform, a voice sample of the at least one talker in vicinity of, or using, the device, accessing a social media associated with the login information of the profile for the one or more users, searching the social media for established connections to the voice print identifier database, and comparing the voice sample of the at least one taker with the voice prints of the profiles with the established connections in the voice print identifier database to determine a match to an identified talker. The method can further provide a portion of the profile of the identified talker if the match is determined. In some embodiments, the searching includes corroborating the profile with the social media to validate an identity of the at least one talker. In some embodiments, the method can further include capturing device specific information of at least one device used during the social media session to capture the voice sample of the at least one talker and associating the login information, the voice print and the device specific information in the profile for each of the one or more users. In some embodiments, the searching includes corroborating the profile which includes the device specific information with the social media to validate the at least one talker that is identified. In some embodiments, the method further includes retrieving the profiles corresponding to the device from the device specific information, or corresponding to a user of the device from the login information, to narrow a searching extent of the voice print stored in the voice identifier database when accessing the social media. In some embodiments, the device specific information is one among a global positioning system (GPS) location, a wi-fi network, a MAC address, an IP address, and a unique device identifier.

In some embodiments, the social media is one among a friend list, a contact list, an email account, a text message history, a call history, an internet search history, a conference event, or a community organization. In some embodiments, the profile includes one among a name, email address, identification number, IP address, vehicle registration plate number, driver's license number, biometric data, face, iris print, fingerprints, or handwriting, credit card numbers, digital identity, date of birth, birthplace, genetic information, telephone number, login name, screen name, nickname, or handle, country, state, or city of residence, age, gender, race, name of a school attended, name of workplace, location of workplace, grades, salary, or job position, or criminal record.

In some embodiments, the method further comprises capturing multiple voices from multiple talkers within vicinity of the device or over a social network and presenting an indication of the identity of some or all of the multiple talkers, including but not limited to, a name, background or contact information of the talkers. In some embodiments, the method is extended to events such as multi-call, multi-conference, video call, group call, multiple person events, speaking engagements or interactive video, and further presenting identification of all identified parties participating in the event.

In some embodiments, the method can include modifying an access control to the device responsive to detecting and verifying a talker, including but not limited to, automatically changing and entering log in credentials, account information, device controls, or personal preferences. In some other embodiments, the method can further include accessing a contact or friend list associated with the talker and narrowing down a searching extent for confirming an identity of the talker from the contact or friend list.

In yet some other embodiments, a system for voice identification and validation can include a voice print identifier database that contains one or more voice prints of opted-in network subscribers, a database server communicatively coupled to the voice print identifier database that controls opt-in procedures for entering, uploading and updating the voice prints, and a social media application communicatively coupled to the voice print identifier database server. The social media application can register one or more users on a social media platform with login information during a social media session, acquire a voice sample at any time of the social media session or a continuation of the social media session, associate the login information and the voice sample in a profile for each of the one or more users, and store the profile as a voice print in the voice print identifier database, where the social media application identifies at least one talker from an interfacing of the social media platform with the voice print identifier database. In some embodiments, the profile includes one among a name, email address, identification number, IP address, vehicle registration plate number, driver's license number, biometric data, face, iris print, fingerprints, or handwriting, credit card numbers, digital identity, date of birth, birthplace, genetic information, telephone number, login name, screen name, nickname, or handle, country, state, or city of residence, age, gender, race, name of a school attended, name of workplace, location of workplace, grades, salary, or job position, or criminal record.

In some embodiments, the social media application captures, with a device equipped with a microphone and communicatively coupled to the social media platform, a voice sample of the at least one talker in vicinity of, or using, the device, accesses a social media associated with the login information of the profile for the one or more users, searches the social media for established connections to the voice print identifier database, compares the voice sample of the at least one taker with the voice prints of the profiles with the established connections in the connections to determine a match to an identified talker, and provides a portion of the profile of the identified talker if the match is determined. In some embodiments, the social media is one among a friend list, a contact list, an email account, a text message history, a call history, an internet search history, a conference event, a community organization.

In some embodiments the social media application captures device specific information of at least one device used during the social media session, associates the login information, the voice print and the device specific information in the profile for each of the one or more user, and corroborates the profile, which includes the device specific information, with the social media to validate the identified talker.

In some embodiments, the social media application retrieves the profile corresponding to the device from the device specific information, or corresponding to a user of the device from the login information, to narrow a searching extent of the voice print stored in the voice identifier database when accessing the social media. In some embodiments, the device specific information is one among a global positioning system (GPS) location, a wi-fi network, a MAC address, an IP address, and a unique device identifier.

Figure 4:
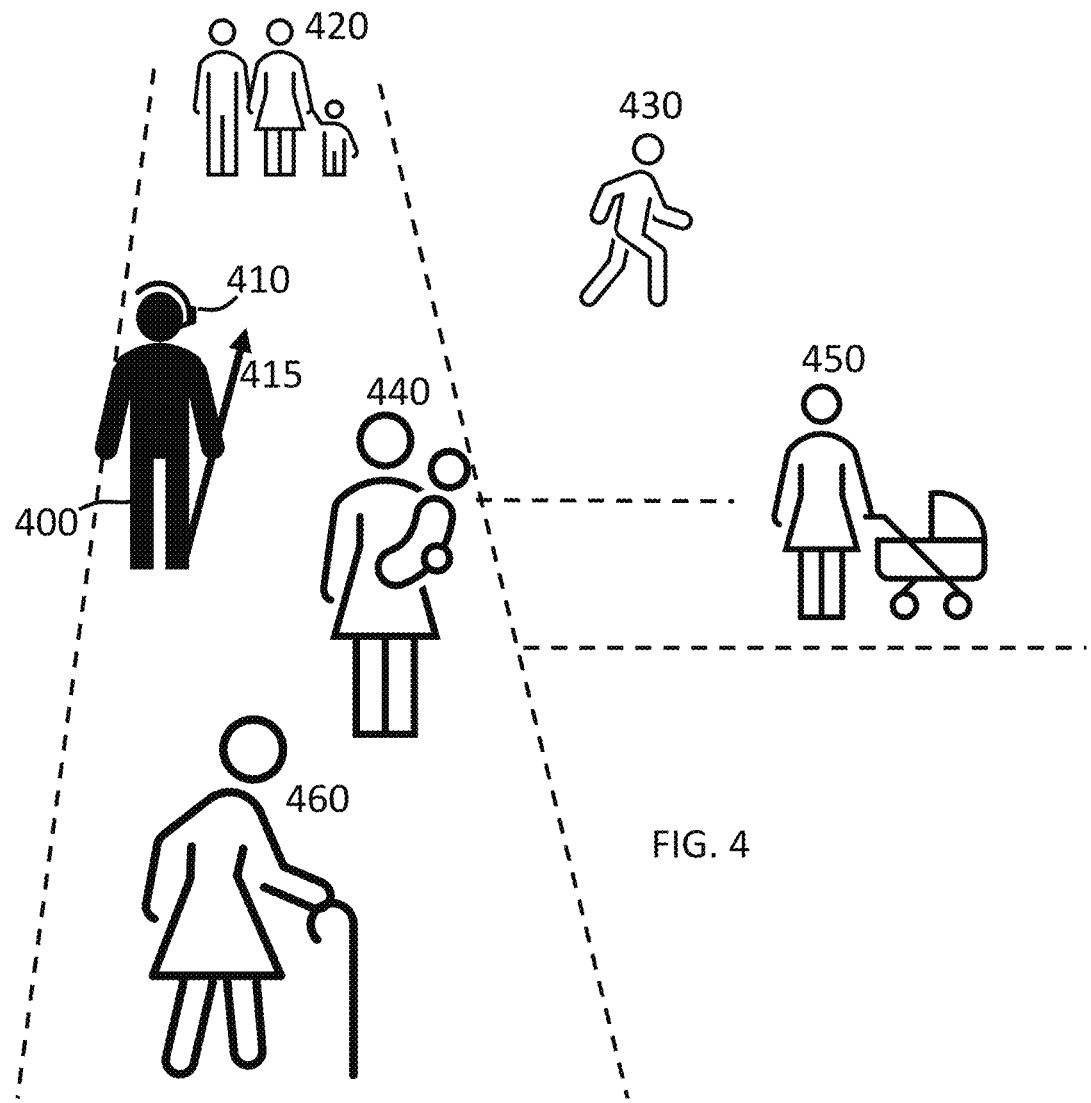
FIG. 4 depicts a user traveling along a path near others.

FIG. 4 depicts a user 400 traveling along a path 415 near others (e.g., 420, 430, 440, 450, 460). Note that the user 400 can be anyone or anything (e.g., vehicle) with an audio recording device 410 (e.g., phone, earphone, ipad). The traveling can be along a path, in buildings, in vehicles, subways, a ship, cave, anywhere a person can travel. If it is later determined that user 400 is a person of interest (e.g., ill, criminal) an acoustic log (e.g., stored acoustic recording of the user's travel) during the periods of interest (e.g., a user 400 is ill, and travel within the last 24 hours is desired) can be queried to determine potential contacts with others (e.g. 420, 430, 440, 450, 460) within the period of interest. If a threshold distance (R) from the contacts is optionally specified, location information (e.g., GPS, Inertial Navigation Systems, compass, accelerometers) for the contacts can be queried and compared to the user's location information during the period of interest, to determine whether the contacts (e.g. 420, 430, 440, 450, 460) approached the user 400 with the distance R for any length of time (although a length of time within the distance R can also be specified an queried). The advantage of coupling acoustic identification information with location information is that in some circumstances (e.g., buildings) location information may not be available (e.g., GPS signal loss), however microphone information may still be available (e.g., voice control activated).

Figure 5:
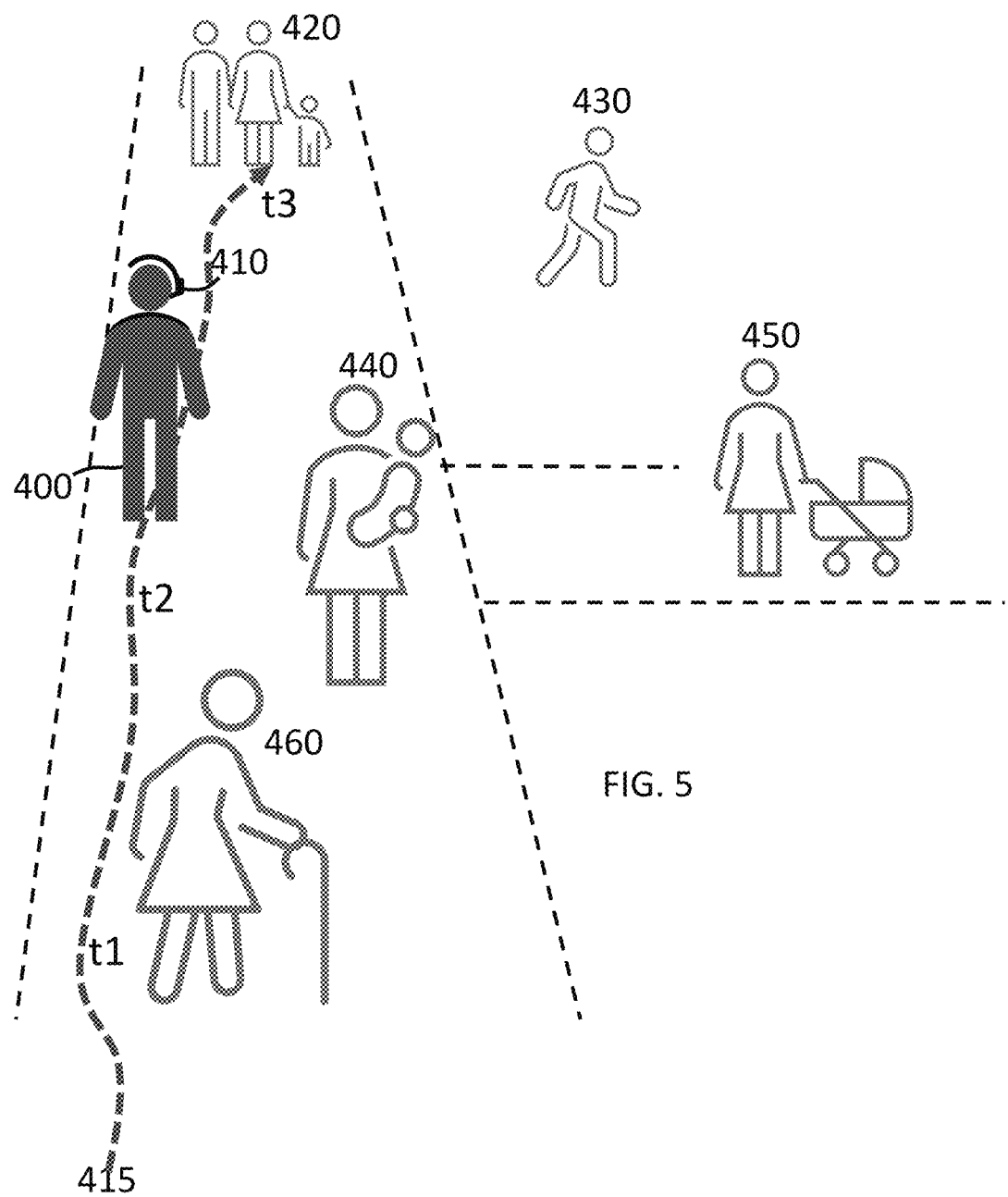
FIG. 5 depicts a user with a pathogen (red outline) traveling along a path near others, where some others are within hazard zones (brown outlines) and others are outside the hazard zones (green outlines)

FIG. 5 depicts a user 400 identified as being a person of interest (e.g., ill with a pathogen (red outline)) traveling along a path 415 near others (e.g., 420, 430, 440, 450, 460), where some others are within an optional identified hazard zone (e.g., within a specified threshold distance R, brown outlines, 420, 440, 460) and others are outside the optional hazard zones (green outlines, 430, 450). Travel along the path 415 is associated with a times that are matched to any acoustic record (e.g., t1, t2, t3). For example if user 400 is identified as ill, an acoustic record for the last 24 hours can be queried, reconstructing the user's 400 path 415, analyzing the acoustic record, for the time period of interest, to identify others (e.g., via Voiceprints) that may have come into contact with the user 400.

Figure 6:
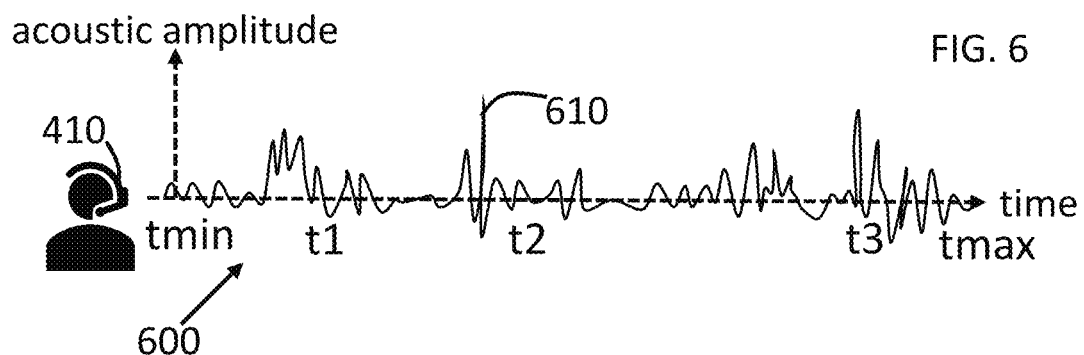
FIG. 6 depicts the time history of acoustics recorded by a user's device.

FIG. 6 depicts (600) the time history of acoustics recorded by a user's device 410. An acoustic record 610 during the period of interest can be queried. The acoustic record can be voltage versus time, sound amplitude versus time, spectral characteristics versus time or any other acoustic information that is time stamped, where the acoustic information is sufficient to use to identify a voiceprint.

Figure 7:
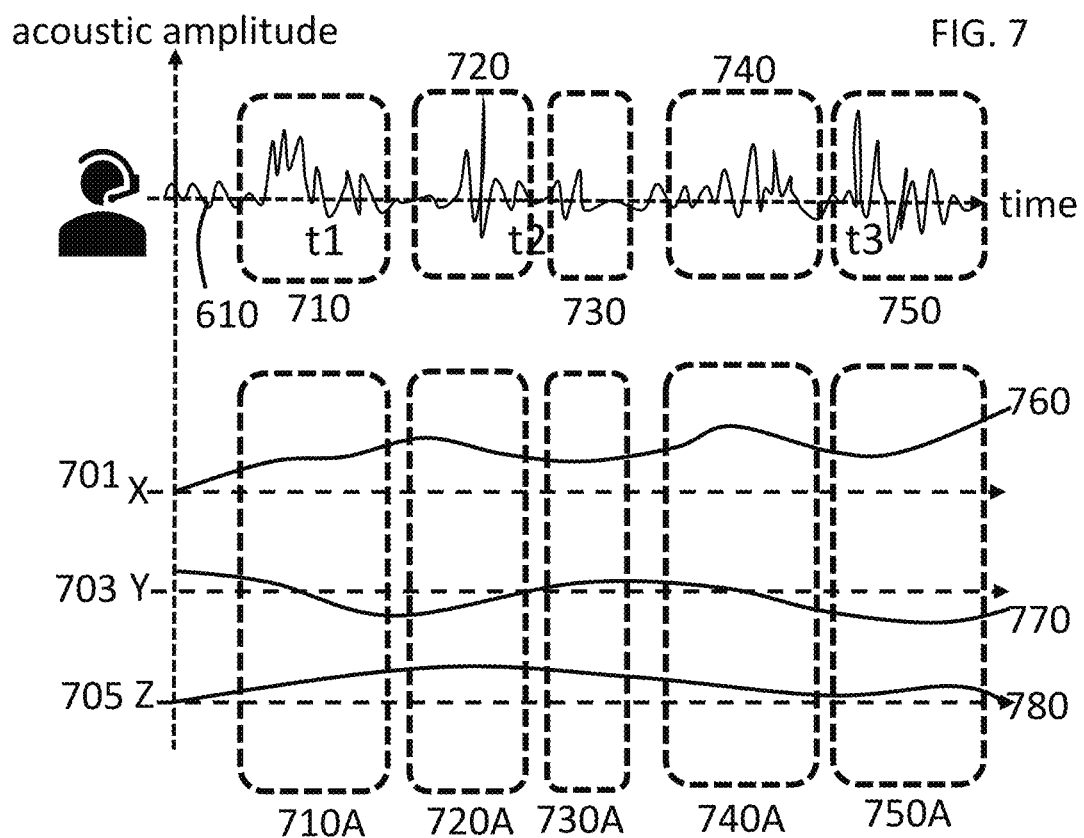
FIG. 7 depicts the time history of acoustics recorded by a user's device shown against positional location of the recordings.

FIG. 7 depicts the time history of acoustics recorded by a user's device 410 shown against positional location (701, 703, 705) of the recordings during a period of interest (tmin to tmax). Acoustic segments (e.g., 710, 720, 730, 740, and 750) are segments of the acoustic record that appear to contain voices (e.g., content between 100 Hz to 6 KHz, above a threshold (e.g., 10 dB to 60 dB above the background noise levels)). The matching location (e.g., derived from GPS values, inertial navigation values, accelerometers, gyroscopic values) of the user 400 during the segments can be identified and time matched (e.g., 710A, 720A, 730A, 740A, 750A) within respective sampling rates (e.g., the time increments associated with acoustic recording may be milliseconds, while the location data may be recorded in time increments of 0.1 seconds, so time matched refers to within a range tmin to tmax). The user's location may change (e.g., 760, 770, 780) during the time period of interest, and this movement can be compared to a contact's location (see FIG. 9) before or after the contact has been acoustically identified.

Figure 8:
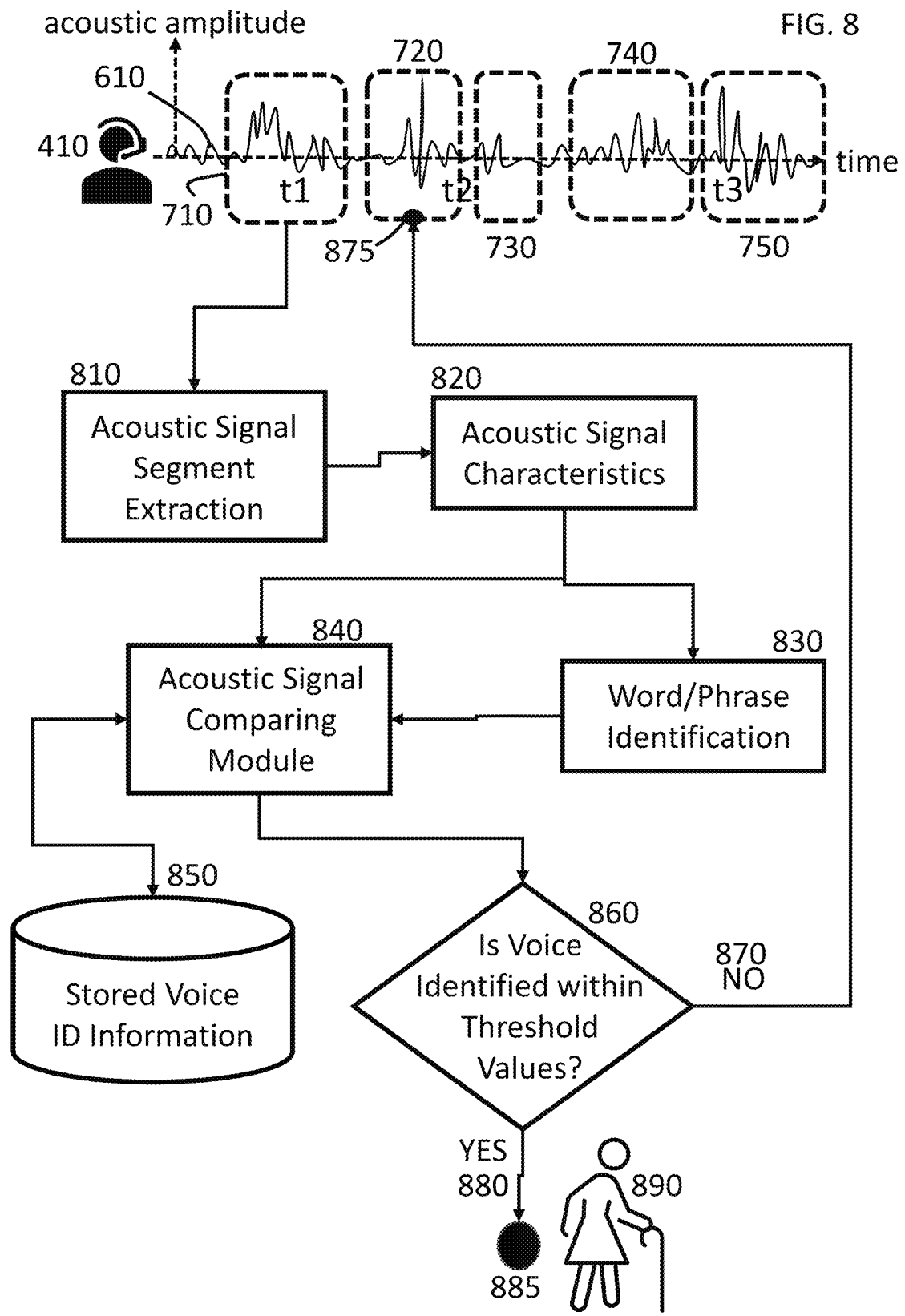
FIG. 8 depicts the time history of acoustics recorded by a user with a process indicated to identify a voice in segments of the recording.

FIG. 8 depicts the time history of acoustics recorded 610 by a user 410 with a process indicated to identify a voice in segments (e.g. 710, 720, 730, 740, 750) of the recording 610. An acoustic signal segment extraction module 810 places the acoustic segment (e.g. 710) into a data buffer. The acoustic segment is analyzed to obtain acoustic signal characteristics 820 (e.g. spectral characteristics (e.g., spectral amplitudes versus frequency) in time, phase angles, amplitudes, self correlation values). Optionally the acoustic signals characteristics 820 can also be used to identify words or phrases using a word/phrase identification module 830. Information/data from word/phrase identification module 830 in addition to the acoustic signal characteristics 820 are sent to an acoustic signal comparing module 840. The acoustic signal comparing module 840 compares the acoustic characteristics to stored values (850) associated with stored voiceprints. If the acoustic signal characteristics 820 match stored values within threshold values (e.g., within 15 dB or less of chosen spectral frequency peaks, note that other threshold matching can be used besides spectral peaks as known by one of ordinary skill in the arts of identifying voiceprints) then a positive 880 voiceprint is identified 890, otherwise a negative identification is noted 870 and the next acoustic segment to analyze 875 is sent to the acoustic signal segment extraction module 810. Once the voiceprint has been identified with a particular contact 890, that contacts information can be queried for cross checking accuracy of the alleged exposure, as discussed in FIG. 9.

Figure 9:
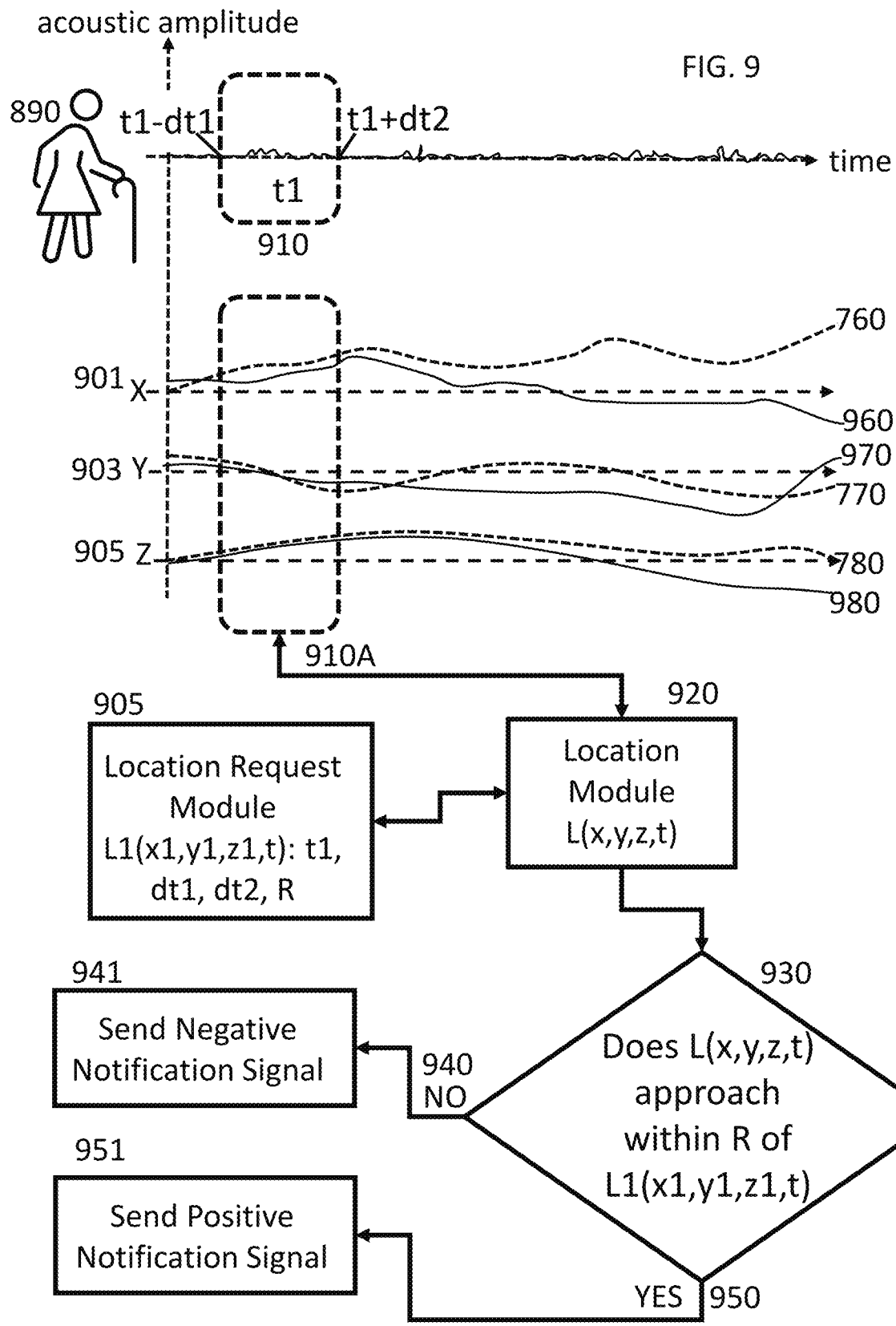
FIG. 9 depicts a second user's acoustic recorded information and location information queried to check proximity to a user exposed to a pathogen.

FIG. 9 depicts an identified contact's 890 acoustic recorded information for a acoustic signal segment 910, encompassing at least the time span of interest associated (e.g., from t1−dt1 to t1+dt2) with exposure to user 400, and the contact's location information (e.g., 901. 903. 905) that can be queried to check proximity to a user 400 (e.g. whom may have been exposed to a pathogen). It is important to note that not all contacts will have acoustic recorded information during the time span of interest. Thus as a secondary check the location data of the contact 890 can be compared with the location data of the user 400 to see if they came within a range of interest, R (e.g., 0 ft-100 ft). the value of R can vary depending upon the query. For example for a contagious pathogen, R may be 6 ft so that for any contact within 6 ft a positive notification is sent. Additionally, the query may be for a missing person or child, and R may be larger, such as 100 ft. For example suppose the user 400 is a missing person whose phone or cloud information is available. The acoustic data may identify persons of interest by voice print, and hence suspects and potential witnesses may be identified. The contact's acoustic signal segment 910 can undergo the process described in FIG. 8 to see if the acoustic data is useful (was recorded, amplitudes large enough) in verifying acoustic contact with the user 400. Even if the acoustic signal segment 910 is not useful, the location data (901, 903, 905) can be compared to the user's 400 location data (701, 703, 705). The variation in the location data (e.g., 960, 970. 980) for the contact 890 can be compared to the location data (760, 770, 780) for the user 400, and compared to see if they approach within R, during the time period of interest (t1−dt1 to t1+dt2). The time period of interest can provide an exposure time that medical professions are interested in, or in the case of persons of interest, periods of times obtained from information from other sources (e.g., witness testimony, gaps in available information). A location request module 905 can send the user's 400 location information in time, distance threshold R, and the time period of interest. This information can be sent to a location module 920, which extracts the relevant location information segment 910A from the contact 890 device(s) comparing the location information from the contact 890 to the user's 400 location information and determining whether 930, during the location segment 910A, did the contact 890 come within a distance R of the user 400. Note that the distance can be the vector distance magnitude (sqrt[ $(x_{901}-x_{701})^2+(y_{903}-y_{703})^2+(z_{903}-z_{703})^2$]<R). If YES, 950 then a positive notification signal 951 (e.g., a text to contact 890, and/or to user 400, or can be a value in a variable such as pos=1) can be recorded and/or sent. If NO, 940 then a negative notification signal 941 (e.g., a text to contact 890, and/or to user 400, or can be a value in a variable such as pos=0) can be recorded and/or sent.

Figure 10:
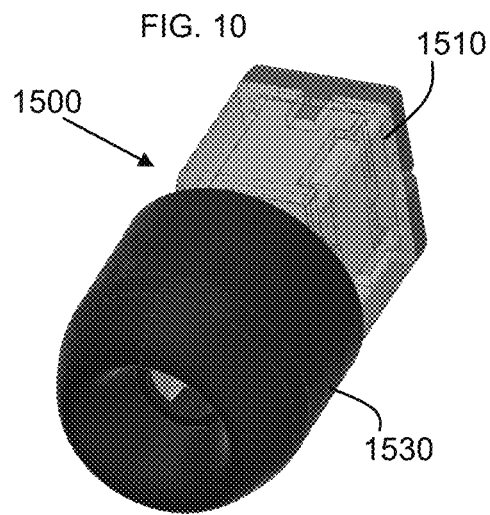
FIG. 10 and FIG. 11 illustrate two earphones each with similar housings accommodating different eartips.
Figure 11:
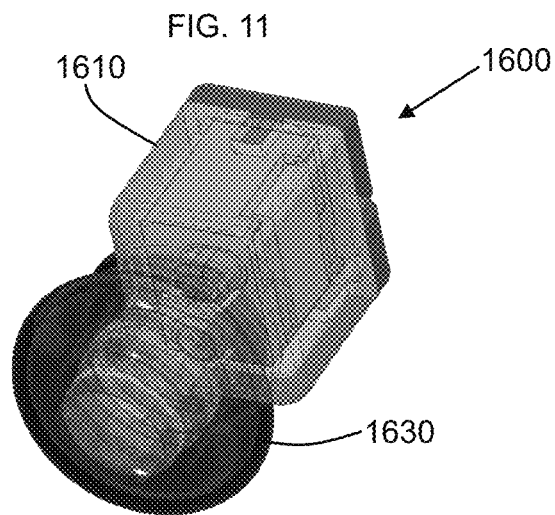

FIG. 10 and FIG. 11 illustrate two earphones 1500 and 1600 respectively. The earphone 1500 shows and earphone housing (EH) 510 that can accommodate a commercially available eartip 1530 (e.g. Comply Tips, flange tips). The earphone housing (e.g. 1510, 1610) can additionally accommodate specialized eartips (e.g. 1630). The EH 1510 can be fabricated (e.g., molded or 3D printed) from various materials (e.g., silicone, 3D printed material, metal, wood) and any material listed herein for any part of an earphone (housing, microphone, speaker, eartips) should not be interpreted as limitative, but as examples only.

Figure 12:
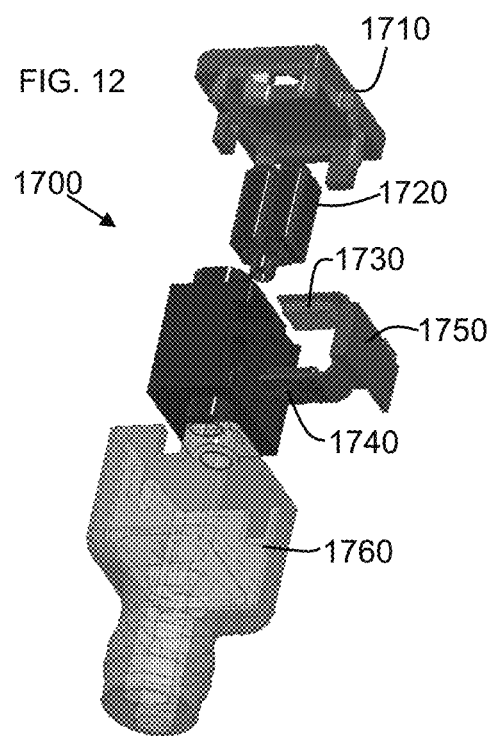
FIG. 12 and FIG. 13 illustrate exploded views of one embodiment of an earphone.
Figure 13:
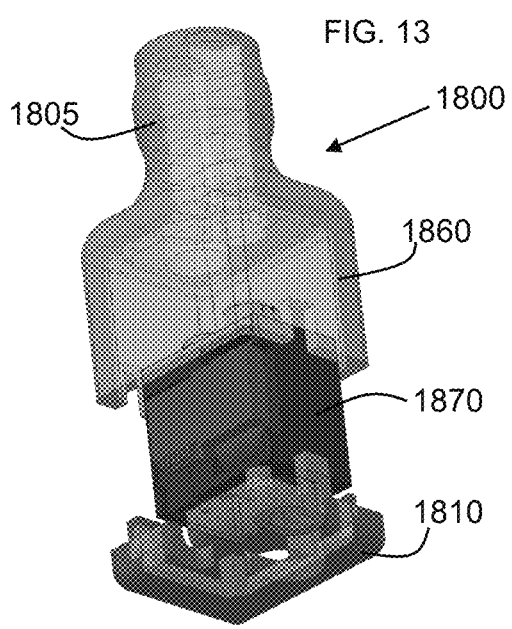

FIG. 12 and FIG. 13 illustrate exploded views of one embodiment of an earphone (e.g. 1700 and 1800) including two microphones (e.g. 1730, 1740, e.g. Mems Digital and Analog microphones, e.g. Knowles SiSonic Microphones, model SPH0641LM4H-1, model TO-30043-000 and other microphones that can be used in earphones or phones), a speaker (e.g. 1720, e.g., Knowles model RAB-32063, model TWFK-30017-000 and other types of speakers that can be used in earphones or phones) and DSP PCB board (e.g., 1750, CSR chips, Wolfson chips, and any other DSP chip that can process audio input that can be used in earphones or phones). The earphone (e.g., 1700, 1800) includes a cap (e.g.

1710, 1810) and an earphone housing (EH) (e.g. 1760, 1860). An electronic package housing (EPH) 1870, houses the electronic parts, for example the microphones (e.g. 1730, 1740), the speakers (e.g. 1720), and the DSP PCB board 1750. The EH 1860 and cap 1810 can change to various configuration keeping the EPH 1870 constant, facilitating testing of the EPH 1870 (with electrical components such as microphones, speakers and DSP inserted) independent of earphone configuration (e.g., shape of housing, stent 1805 length).

The materials for the EPH 1870, EH 1860 and the cap 1810 can vary depending upon desired flexibility, level of hydrophobicity required, transparency, electrical isolation, RF shielding, and other properties known by one of ordinary skill in the arts of earphone design. For example, the EPH 1870, EH 1860, cap 1810 can be 3D printed for example using resins such as Form labs™ elastic resin, tough, grey-pro resins or other 3D printing materials as known by one of ordinary skill in fabricating small parts with tolerances of at least 2 mm. Additionally, the parts can be molded such as with elastosil®LR3004/30B, silicone, polyurethanes, rubber, Neoprene, or any other type of moldable material as known by one of ordinary skill in the arts of designing or fabricating earphone parts with tolerances of at least 2 mm. Additionally the parts (EPH, EH, cap) can be formed of wood metal and glass.

Figure 14:
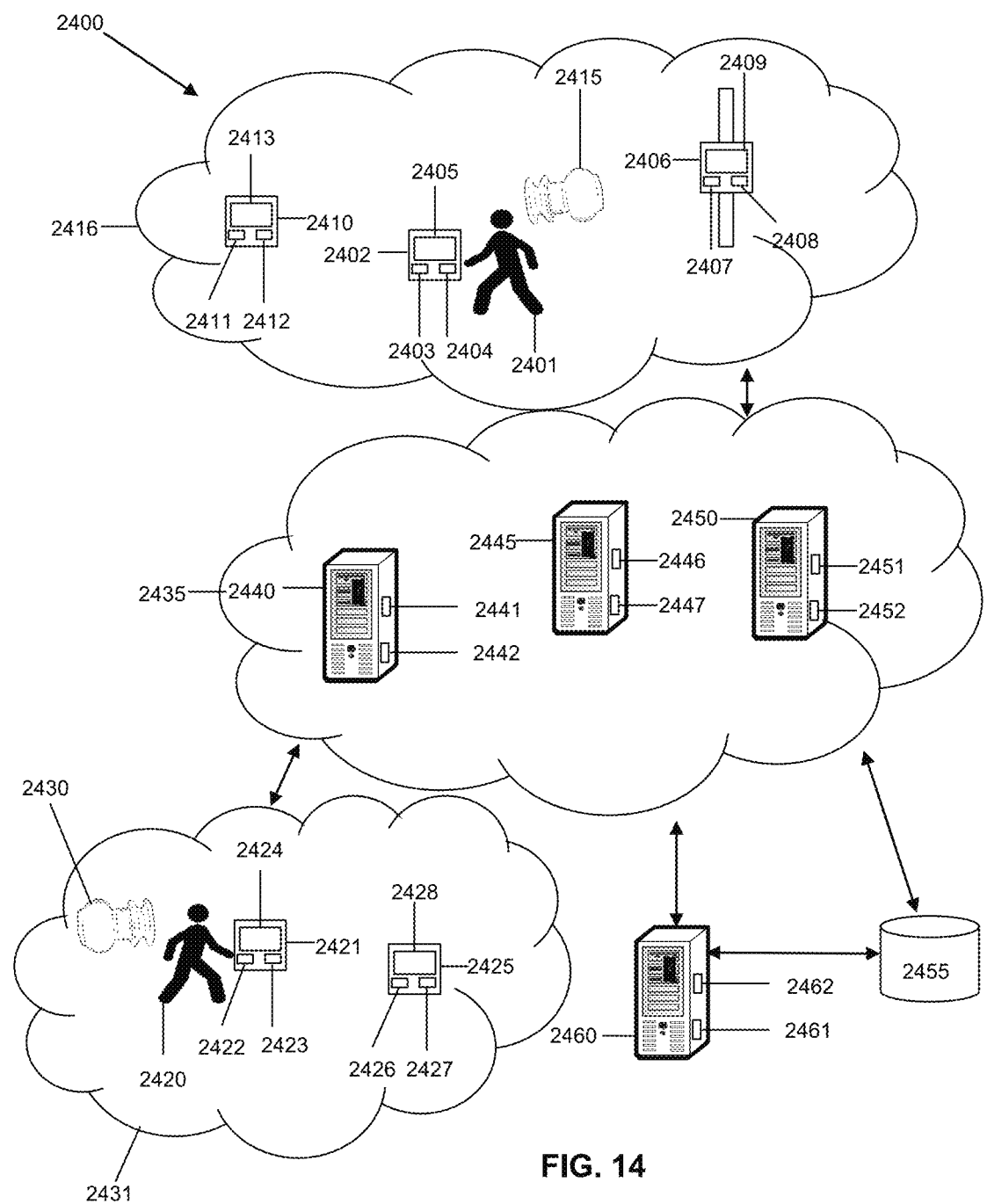
FIG. 14 is a schematic diagram of a system for utilizing eartips according to an embodiment of the present disclosure.

As shown in FIG. 14, a system 2400 and methods for utilizing eartips and/or earphone devices are disclosed.

The system 2400 may be configured to support, but is not limited to supporting, data and content services, audio processing applications and services, audio output and/or input applications and services, applications and services for transmitting and receiving audio content, authentication applications and services, computing applications and services, cloud computing services, internet services, satellite services, telephone services, software as a service (SaaS) applications, platform-as-a-service (PaaS) applications, gaming applications and services, social media applications and services, productivity applications and services, voice-over-internet protocol (VoIP) applications and services, speech-to-text translation applications and services, interactive voice applications and services, mobile applications and services, and any other computing applications and services. The system may include a first user 2401, who may utilize a first user device 2402 to access data, content, and applications, or to perform a variety of other tasks and functions. As an example, the first user 2401 may utilize first user device 2402 to access an application (e.g. a browser or a mobile application) executing on the first user device 2402 that may be utilized to access web pages, data, and content associated with the system 2400. In certain embodiments, the first user 2401 may be any type of user that may potentially desire to listen to audio content, such as from, but not limited to, a music playlist accessible via the first user device 2402, a telephone call that the first user 2401 is participating in, audio content occurring in an environment in proximity to the first user 2401, any other type of audio content, or a combination thereof. For example, the first user 2401 may be an individual that may be participating in a telephone call with another user, such as second user 2420.

The first user device 2402 utilized by the first user 2401 may include a memory 2403 that includes instructions, and a processor 2404 that executes the instructions from the memory 2403 to perform the various operations that are performed by the first user device 2402. In certain embodiments, the processor 2404 may be hardware, software, or a combination thereof. The first user device 2402 may also include an interface 2405 (e.g. screen, monitor, graphical user interface, etc.) that may enable the first user 2401 to interact with various applications executing on the first user device 2402, to interact with various applications executing within the system 2400, and to interact with the system 2400 itself. In certain embodiments, the first user device 2402 may include any number of transducers, such as, but not limited to, microphones, speakers, any type of audio-based transducer, any type of transducer, or a combination thereof. In certain embodiments, the first user device 2402 may be a computer, a laptop, a tablet device, a phablet, a server, a mobile device, a smartphone, a smart watch, and/or any other type of computing device. Illustratively, the first user device 2402 is shown as a mobile device in FIG. 24. The first user device 2402 may also include a global positioning system (GPS), which may include a GPS receiver and any other necessary components for enabling GPS functionality, accelerometers, gyroscopes, sensors, and any other componentry suitable for a mobile device.

In addition to using first user device 2402, the first user 2401 may also utilize and/or have access to a second user device 2406 and a third user device 2410. As with first user device 2402, the first user 2401 may utilize the second and third user devices 2406, 2410 to transmit signals to access various online services and content. The second user device 2406 may include a memory 2407 that includes instructions, and a processor 2408 that executes the instructions from the memory 2407 to perform the various operations that are performed by the second user device 2406. In certain embodiments, the processor 2408 may be hardware, software, or a combination thereof. The second user device 2406 may also include an interface 2409 that may enable the first user 2401 to interact with various applications executing on the second user device 2406 and to interact with the system 2400. In certain embodiments, the second user device 2406 may include any number of transducers, such as, but not limited to, microphones, speakers, any type of audio-based transducer, any type of transducer, or a combination thereof. In certain embodiments, the second user device 2406 may be and/or may include a computer, any type of sensor, a laptop, a set-top-box, a tablet device, a phablet, a server, a mobile device, a smartphone, a smart watch, and/or any other type of computing device. Illustratively, the second user device 2402 is shown as a smart watch device in FIG. 24.

The third user device 2410 may include a memory 2411 that includes instructions, and a processor 2412 that executes the instructions from the memory 2411 to perform the various operations that are performed by the third user device 2410. In certain embodiments, the processor 2412 may be hardware, software, or a combination thereof. The third user device 2410 may also include an interface 2413 that may enable the first user 2401 to interact with various applications executing on the second user device 2406 and to interact with the system 2400. In certain embodiments, the third user device 2410 may include any number of transducers, such as, but not limited to, microphones, speakers, any type of audio-based transducer, any type of transducer, or a combination thereof. In certain embodiments, the third user device 2410 may be and/or may include a computer, any type of sensor, a laptop, a set-top-box, a tablet device, a phablet, a server, a mobile device, a smartphone, a smart watch, and/or any other type of computing device. Illustratively, the third user device 2410 is shown as a smart watch device.

The first, second, and/or third user devices 2402, 2406, 2410 may belong to and/or form a communications network 2416. In certain embodiments, the communications network 2416 may be a local, mesh, or other network that facilitates communications among the first, second, and/or third user devices 2402, 2406, 2410 and/or any other devices, programs, and/or networks of system 2400 or outside system 2400. In certain embodiments, the communications network 2416 may be formed between the first, second, and third user devices 2402, 2406, 2410 through the use of any type of wireless or other protocol and/or technology. For example, the first, second, and third user devices 2402, 2406, 2410 may communicate with one another in the communications network 2416, such as by utilizing Bluetooth Low Energy (BLE), classic Bluetooth, ZigBee, cellular, NFC, Wi-Fi, Z-Wave, ANT+, IEEE 802.15.4, IEEE 802.22, ISA100a, infrared, ISM band, RFID, UWB, Wireless HD, Wireless USB, any other protocol and/or wireless technology, satellite, fiber, or any combination thereof. Notably, the communications network 2416 may be configured to communicatively link with and/or communicate with any other network of the system 2400 and/or outside the system 2400.

The system 2400 may also include an earphone device 2415, which the first user 2401 may utilize to hear and/or audition audio content, transmit audio content, receive audio content, experience any type of content, process audio content, adjust audio content, store audio content, perform any type of operation with respect to audio content, or a combination thereof. The earphone device 2415 may be an earpiece, a hearing aid, an ear monitor, an ear terminal, a behind-the-ear device, any type of acoustic device, or a combination thereof. The earphone device 2415 may include any type of component utilized for any type of earpiece. In certain embodiments, the earphone device 2415 may include any number of ambient sound microphones that may be configured to capture and/or measure ambient sounds and/or audio content occurring in an environment that the earphone device 2415 is present in and/or is proximate to. In certain embodiments, the ambient sound microphones may be placed at a location or locations on the earphone device 2415 that are conducive to capturing and measuring ambient sounds occurring in the environment. For example, the ambient sound microphones may be positioned in proximity to a distal end (e.g. the end of the earphone device 2415 that is not inserted into the first user's 2401 ear) of the earphone device 2415 such that the ambient sound microphones are in an optimal position to capture ambient or other sounds occurring in the environment. In certain embodiments, the earphone device 2415 may include any number of ear canal microphones, which may be configured to capture and/or measure sounds occurring in an ear canal of the first user 2401 or other user wearing the earphone device 2415. In certain embodiments, the ear canal microphones may be positioned in proximity to a proximal end (e.g. the end of the earphone device 2415 that is inserted into the first user's 2401 ear) of the earphone device 2415 such that sounds occurring in the ear canal of the first user 2401 may be captured more readily.

The earphone device 2415 may also include any number of transceivers, which may be configured transmit signals to and/or receive signals from any of the devices in the system 2400. In certain embodiments, a transceiver of the earphone device 2415 may facilitate wireless connections and/or transmissions between the earphone device 2415 and any device in the system 2400, such as, but not limited to, the first user device 2402, the second user device 2406, the third user device 2410, the fourth user device 2421, the fifth user device 2425, the earphone device 2430, the servers 2440, 2445, 2450, 2460, and the database 2455. The earphone device 2415 may also include any number of memories for storing content and/or instructions, processors that execute the instructions from the memories to perform the operations for the earphone device 2415, and/or any type integrated circuit for facilitating the operation of the earphone device 2415. In certain embodiments, the processors may comprise, hardware, software, or a combination of hardware and software. The earphone device 2415 may also include one or more ear canal receivers, which may be speakers for outputting sound into the ear canal of the first user 2401. The ear canal receivers may output sounds obtained via the ear canal microphones, ambient sound microphones, any of the devices in the system 2400, from a storage device of the earphone device 2415, or any combination thereof.

The ear canal receivers, ear canal microphones, transceivers, memories, processors, integrated circuits, and/or ear canal receivers may be affixed to an electronics package that includes a flexible electronics board. The earphone device 2415 may include an electronics packaging housing that may house the ambient sound microphones, ear canal microphones, ear canal receivers (i.e. speakers), electronics supporting the functionality of the microphones and/or receivers, transceivers for receiving and/or transmitting signals, power sources (e.g. batteries and the like), any circuitry facilitating the operation of the earphone device 2415, or any combination thereof. The electronics package including the flexible electronics board may be housed within the electronics packaging housing to form an electronics packaging unit. The earphone device 2415 may further include an earphone housing, which may include receptacles, openings, and/or keyed recesses for connecting the earphone housing to the electronics packaging housing and/or the electronics package. For example, nozzles of the electronics packaging housing may be inserted into one or more keyed recesses of the earphone housing so as to connect and secure the earphone housing to the electronics packaging housing. When the earphone housing is connected to the electronics packaging housing, the combination of the earphone housing and the electronics packaging housing may form the earphone device 2415. The earphone device 2415 may further include a cap for securing the electronics packaging housing, the earphone housing, and the electronics package together to form the earphone device 2415.

In certain embodiments, the earphone device 2415 may be configured to have any number of changeable tips, which may be utilized to facilitate the insertion of the earphone device 2415 into an ear aperture of an ear of the first user 2401, secure the earphone device 2415 within the ear canal of an ear of the first user 2401, and/or to isolate sound within the ear canal of the first user 2401. The tips may be foam tips, which may be affixed onto an end of the earphone housing of the earphone device 2415, such as onto a stent and/or attachment mechanism of the earphone housing. In certain embodiments, the tips may be any type of eartip as disclosed and described in the present disclosure. The eartips as disclosed in the present disclosure may be configured to facilitate distributed reduced contact force, sound isolation for sound in the ear canal of the first user 2401 (i.e. between the ambient environment and the ear canal environment within an ear of the first user 2401), mold into a variety of forms and/or positions, encapsulate volumes upon insertion into an ear aperture of the first user 2401, have a pressure adjusting design, facilitate notched stent retention (i.e. on a stent of the earphone housing), facilitate stent insertion into an ear canal of the first user 2401 via an ear aperture of the first user 2401, or any combination thereof. In certain embodiments, the eartip may be designed to provide sound isolation capability that is at least as effective as conventional foam and/or flange tips. Notably, the eartips may be manufactured and configured to be made in any desired size specifications and/or materials, and may be tailored to each individual user, such as first user 2401. In contrast to conventional foam or flange tips, an eartip according to the present disclosure may be adjusted for size without having to substitute the eartip with another eartip, may have an EPA NRR rating of NRR=18, may have a unique flatter high frequency attenuation profile so as to maintain audio quality, may have ease of manufacturability, and may be designed to distribute contact force and minimize radial force against a user's ear canal walls when positioned in a user's ear canal. Additionally, an eartip according to the present disclosure may be made of a non-porous material that is not closed cell foam or open cell foam.

In certain embodiments, the eartip may be designed so that the earphone device's 2415 retention force on the ear canal walls of the first user 2401 may be distributed over a larger area than traditional foam or flange tips allow, thereby reducing the pressure on the ear canal walls of the first user 2401. Unlike foam tips, which primarily provide a restoring radial force that exerts pressure against the ear canal walls of a user, the eartip is designed to move both radially and axially, which allows for more give and redistribution of contact over a larger area, and, thus, decreases the retention pressure. As a result, this allows for increased comfort for the user and allows the user to utilize the eartip for an extended period of time when compared to traditional foam and/or flange tips. In certain embodiments, the eartip utilized with the earphone device 2415 may be configured to encapsulate a volume of gas and/or liquid. In either case (i.e. gas or liquid), the bulk of sound isolation provided by the eartip is achieved through the reflection of ambient sound waves so that the encapsulated volume can be low mass. In certain embodiments, portions of the eartip may encapsulate a volume with the ability to release volume when pressed upon without having to incorporate complicated valves. The encapsulated volume may be achieved by the ear canal wall pressing radially and/or axially against the outer surfaces of the eartip, which may force the outer portion of the eartip to seal with the inner portion of the eartip. In certain embodiments, the inner portion of the eartip may be small than the outer diameter of the stent of the earphone housing upon which the eartip is placed so that upon insertion of the eartip on the stent, the inner portion stretches outward to meet the outer surface of the eartip, which further facilitates the sealing of the ear canal of the first user 2401.

In certain embodiments, the stent of the eartip, over which the eartip is placed, may be designed to have a smaller diameter front end and a larger diameter middle section to promote retention of the eartip on the stent itself. In certain embodiments, a portion of the eartip may have an inner core diameter that is smaller than the stent outer diameter so that the eartip provides radial compression upon the stent so as to enhance sealing and to add friction to prevent axial slippage within the ear canal of the first user 2401. In certain embodiments, an increased mid-section inner core diameter of the eartip may be utilized (i.e. larger than the smaller inner core diameter of the eartip), which may be configured to line up with the mid-section outer diameter of the stent of the earphone housing of the earphone device 2415. This may provide axial stability for the earphone device 2415, while simultaneously preventing axial slippage from the ear canal of the first user 2401. In certain embodiments, the eartip may have an insertion end that has a funnel shape, which aids in inserting the eartip onto the stent of the earphone housing of the earphone device 2415.

In certain embodiments, the eartip has a configuration that applies minimal force against the first user's 2401 ear canal. Additionally, the eartip can seal the first user's 2401 ear canal by providing at least 15 dB of attenuation across frequency. To facilitate manufacturability, the eartip may be molded inverted, thereby allowing inexpensive mass production. Lips of the eartip may then be folded to contact ledges to for the eartip that may be utilized by the first user 2401. Sealing and comfort depend upon an accurate fit within the first user's 2401 ear canal, and, as a result, eartips according to the present disclosure may be manufactured in several single sizes, and, because of the unique design of the eartips, a single eartip may be adjusted to fit multiple sizes, which minimizes manufacturing costs, while allowing for more flexibility, versatility, and for a greater number of sizes for the eartip. Notably, any of the features of any of the eartips described in the present disclosure may be combined and/or interchanged with any other eartips described in the present disclosure. Furthermore, the shape, size, features and/or functionality of any of the components of the earphone device and/or hearbud housing device described in the present disclosure may be modified for each particular user for the shape and size of each user's ear aperture and/or ear canal, or a combination thereof.

Notably, in experiments conducted using the eartip, the experiments have shown that the eartip allows for similar levels of sound isolation when compared to conventional foam and/or flange tips. For example, experiments have shown that the eartips provided in the present disclosure provided a NRR of 18 with a generally flat high frequency profile. A flat attenuation profile maintains an ambient environment's frequency profile when level reduced by the attenuation, which can be useful in maintaining the quality of ambient speech and music (or other audio content) during the level reduction process.

In further embodiments, the eartip may be configured to have an open configuration prior to insertion onto a stent of the earphone housing and/or the earphone device 2415 itself. By having an open configuration, the eartip may be mass produced using conventional molding techniques and/or by utilizing 3D commercial printers. The open configuration of the eartip also facilitates molding, and can be 3D printed, where the open configuration allows for resin removal. For example, resin removal may be achieved by utilizing commercial 3D printers that allow the use of lower durometer materials, such as Stratasys machines and the like. In certain embodiments, since the eartip has an open configuration, which is then sealed, any additional pressure can force encapsulated gas out of the eartip relieving the feedback pressure so as to keep the comfort level for the first user 2401 relatively stable.

In addition to the first user 2401, the system 2400 may include a second user 2420, who may utilize a fourth user device 2421 to access data, content, and applications, or to perform a variety of other tasks and functions. Much like the first user 2401, the second user 2420 may be may be any type of user that may potentially desire to listen to audio content, such as from, but not limited to, a storage device of the fourth user device 2421, a telephone call that the second user 2420 is participating in, audio content occurring in an environment in proximity to the second user 2420, any other type of audio content, or a combination thereof. For example, the second user 2420 may be an individual that may be listening to songs stored in a playlist that resides on the fourth user device 2421. Also, much like the first user 2401, the second user 2420 may utilize fourth user device 2421 to access an application (e.g. a browser or a mobile application) executing on the fourth user device 2421 that may be utilized to access web pages, data, and content associated with the system 2400. The fourth user device 2421 may include a memory 2422 that includes instructions, and a processor 2423 that executes the instructions from the memory 2422 to perform the various operations that are performed by the fourth user device 2421. In certain embodiments, the processor 2423 may be hardware, software, or a combination thereof. The fourth user device 2421 may also include an interface 2424 (e.g. a screen, a monitor, a graphical user interface, etc.) that may enable the second user 2420 to interact with various applications executing on the fourth user device 2421, to interact with various applications executing in the system 2400, and to interact with the system 2400. In certain embodiments, the fourth user device 2421 may include any number of transducers, such as, but not limited to, microphones, speakers, any type of audio-based transducer, any type of transducer, or a combination thereof. In certain embodiments, the fourth user device 2421 may be a computer, a laptop, a tablet device, a phablet, a server, a mobile device, a smartphone, a smart watch, and/or any other type of computing device. Illustratively, the fourth user device 2421 may be a computing device in FIG. 24. The fourth user device 2421 may also include any of the componentry described for first user device 2402, the second user device 2406, and/or the third user device 2410. In certain embodiments, the fourth user device 2421 may also include a global positioning system (GPS), which may include a GPS receiver and any other necessary components for enabling GPS functionality, accelerometers, gyroscopes, sensors, and any other componentry suitable for a computing device.

In addition to using fourth user device 2421, the second user 2420 may also utilize and/or have access to a fifth user device 2425. As with fourth user device 2421, the second user 2420 may utilize the fourth and fifth user devices 2421, 2425 to transmit signals to access various online services and content. The fifth user device 2425 may include a memory 2426 that includes instructions, and a processor 2427 that executes the instructions from the memory 2426 to perform the various operations that are performed by the fifth user device 2425. In certain embodiments, the processor 2427 may be hardware, software, or a combination thereof. The fifth user device 2425 may also include an interface 2428 that may enable the second user 2420 to interact with various applications executing on the fifth user device 2425 and to interact with the system 2400. In certain embodiments, the fifth user device 2425 may include any number of transducers, such as, but not limited to, microphones, speakers, any type of audio-based transducer, any type of transducer, or a combination thereof. In certain embodiments, the fifth user device 2425 may be and/or may include a computer, any type of sensor, a laptop, a set-top-box, a tablet device, a phablet, a server, a mobile device, a smartphone, a smart watch, and/or any other type of computing device. Illustratively, the fifth user device 2425 is shown as a tablet device in FIG. 24.

The fourth and fifth user devices 2421, 2425 may belong to and/or form a communications network 2431. In certain embodiments, the communications network 2431 may be a local, mesh, or other network that facilitates communications between the fourth and fifth user devices 2421, 2425, and/or any other devices, programs, and/or networks of system 2400 or outside system 2400. In certain embodiments, the communications network 2431 may be formed between the fourth and fifth user devices 2421, 2425 through the use of any type of wireless or other protocol and/or technology. For example, the fourth and fifth user devices 2421, 2425 may communicate with one another in the communications network 2416, such as by utilizing BLE, classic Bluetooth, ZigBee, cellular, NFC, Wi-Fi, Z-Wave, ANT+, IEEE 802.15.4, IEEE 802.22, ISA100a, infrared, ISM band, RFID, UWB, Wireless HD, Wireless USB, any other protocol and/or wireless technology, satellite, fiber, or any combination thereof. Notably, the communications network 2431 may be configured to communicatively link with and/or communicate with any other network of the system 2400 and/or outside the system 2400.

Much like first user 2401, the second user 2420 may have his or her own earphone device 2430. The earphone device 2430 may be utilized by the second user 2420 to hear and/or audition audio content, transmit audio content, receive audio content, experience any type of content, process audio content, adjust audio content, store audio content, perform any type of operation with respect to audio content, or a combination thereof. The earphone device 2430 may be an earpiece, a hearing aid, an ear monitor, an ear terminal, a behind-the-ear device, any type of acoustic device, or a combination thereof. The earphone device 2430 may include any type of component utilized for any type of earpiece, and may include any of the features, functionality and/or components described and/or usable with earphone device 2415. For example, earphone device 2430 may include any number of transceivers, ear canal microphones, ambient sound microphones, processors, memories, housings, eartips, foam tips, flanges, any other component, or any combination thereof.

In certain embodiments, the first, second, third, fourth, and/or fifth user devices 2402, 2406, 2410, 2421, 2425 and/or earphone devices 2415, 2430 may have any number of software applications and/or application services stored and/or accessible thereon. For example, the first and second user devices 2402, 2411 may include applications for processing audio content, applications for playing, editing, transmitting, and/or receiving audio content, streaming media applications, speech-to-text translation applications, cloud-based applications, search engine applications, natural language processing applications, database applications, algorithmic applications, phone-based applications, product-ordering applications, business applications, e-commerce applications, media streaming applications, content-based applications, database applications, gaming applications, internet-based applications, browser applications, mobile applications, service-based applications, productivity applications, video applications, music applications, social media applications, presentation applications, any other type of applications, any types of application services, or a combination thereof. In certain embodiments, the software applications and services may include one or more graphical user interfaces so as to enable the first and second users 2401, 2420 to readily interact with the software applications. The software applications and services may also be utilized by the first and second users 2401, 2420 to interact with any device in the system 2400, any network in the system 2400 (e.g. communications networks 2416, 2431, 2435), or any combination thereof. For example, the software applications executing on the first, second, third, fourth, and/or fifth user devices 2402, 2406, 2410, 2421, 2425 and/or earphone devices 2415, 2430 may be applications for receiving data, applications for storing data, applications for auditioning, editing, storing and/or processing audio content, applications for receiving demographic and preference information, applications for transforming data, applications for executing mathematical algorithms, applications for generating and transmitting electronic messages, applications for generating and transmitting various types of content, any other type of applications, or a combination thereof. In certain embodiments, the first, second, third, fourth, and/or fifth user devices 2402, 2406, 2410, 2421, 2425 and/or earphone devices 2415, 2430 may include associated telephone numbers, internet protocol addresses, device identities, or any other identifiers to uniquely identify the first, second, third, fourth, and/or fifth user devices 2402, 2406, 2410, 2421, 2425 and/or earphone devices 2415, 2430 and/or the first and second users 2401, 2420. In certain embodiments, location information corresponding to the first, second, third, fourth, and/or fifth user devices 2402, 2406, 2410, 2421, 2425 and/or earphone devices 2415, 2430 may be obtained based on the internet protocol addresses, by receiving a signal from the first, second, third, fourth, and/or fifth user devices 2402, 2406, 2410, 2421, 2425 and/or earphone devices 2415, 2430 or based on profile information corresponding to the first, second, third, fourth, and/or fifth user devices 2402, 2406, 2410, 2421, 2425 and/or earphone devices 2415, 2430.

The system 2400 may also include a communications network 2435. The communications network 2435 may be under the control of a service provider, the first and/or second users 2401, 2420, any other designated user, or a combination thereof. The communications network 2435 of the system 2400 may be configured to link each of the devices in the system 2400 to one another. For example, the communications network 2435 may be utilized by the first user device 2402 to connect with other devices within or outside communications network 2435. Additionally, the communications network 2435 may be configured to transmit, generate, and receive any information and data traversing the system 2400. In certain embodiments, the communications network 2435 may include any number of servers, databases, or other componentry. The communications network 2435 may also include and be connected to a mesh network, a local network, a cloud-computing network, an IMS network, a VoIP network, a security network, a VoLTE network, a wireless network, an Ethernet network, a satellite network, a broadband network, a cellular network, a private network, a cable network, the Internet, an internet protocol network, MPLS network, a content distribution network, any network, or any combination thereof. Illustratively, servers 2440, 2445, and 2450 are shown as being included within communications network 2435. In certain embodiments, the communications network 2435 may be part of a single autonomous system that is located in a particular geographic region, or be part of multiple autonomous systems that span several geographic regions.

Notably, the functionality of the system 2400 may be supported and executed by using any combination of the servers 2440, 2445, 2450, and 2460. The servers 2440, 2445, and 2450 may reside in communications network 2435, however, in certain embodiments, the servers 2440, 2445, 2450 may reside outside communications network 2435. The servers 2440, 2445, and 2450 may provide and serve as a server service that performs the various operations and functions provided by the system 2400. In certain embodiments, the server 2440 may include a memory 2441 that includes instructions, and a processor 2442 that executes the instructions from the memory 2441 to perform various operations that are performed by the server 2440. The processor 2442 may be hardware, software, or a combination thereof. Similarly, the server 2445 may include a memory 2446 that includes instructions, and a processor 2447 that executes the instructions from the memory 2446 to perform the various operations that are performed by the server 2445. Furthermore, the server 2450 may include a memory 2451 that includes instructions, and a processor 2452 that executes the instructions from the memory 2451 to perform the various operations that are performed by the server 2450. In certain embodiments, the servers 2440, 2445, 2450, and 2460 may be network servers, routers, gateways, switches, media distribution hubs, signal transfer points, service control points, service switching points, firewalls, routers, edge devices, nodes, computers, mobile devices, or any other suitable computing device, or any combination thereof. In certain embodiments, the servers 2440, 2445, 2450 may be communicatively linked to the communications network 2435, the communications network 2416, the communications network 2431, any network, any device in the system 2400, any program in the system 2400, or any combination thereof.

The database 2455 of the system 2400 may be utilized to store and relay information that traverses the system 2400, cache content that traverses the system 2400, store data about each of the devices in the system 2400 and perform any other typical functions of a database. In certain embodiments, the database 2455 may be connected to or reside within the communications network 2435, the communications network 2416, the communications network 2431, any other network, or a combination thereof. In certain embodiments, the database 2455 may serve as a central repository for any information associated with any of the devices and information associated with the system 2400. Furthermore, the database 2455 may include a processor and memory or be connected to a processor and memory to perform the various operation associated with the database 2455. In certain embodiments, the database 2455 may be connected to the earphone devices 2415, 2430, the servers 2440, 2445, 2450, 2460, the first user device 2402, the second user device 2406, the third user device 2410, the fourth user device 2421, the fifth user device 2425, any devices in the system 2400, any other device, any network, or any combination thereof.

The database 2455 may also store information and metadata obtained from the system 2400, store metadata and other information associated with the first and second users 2401, 2420, store user profiles associated with the first and second users 2401, 2420, store device profiles associated with any device in the system 2400, store communications traversing the system 2400, store user preferences, store information associated with any device or signal in the system 2400, store information relating to patterns of usage relating to the first, second, third, fourth, and fifth user devices 2402, 2406, 2410, 2421, 2425, store audio content associated with the first, second, third, fourth, and fifth user devices 2402, 2406, 2410, 2421, 2425 and/or earphone devices 2415, 2430, store audio content and/or information associated with the audio content that is captured by the ambient sound microphones, store audio content and/or information associated with audio content that is captured by ear canal microphones, store any information obtained from any of the networks in the system 2400, store audio content and/or information associated with audio content that is outputted by ear canal receivers of the system 2400, store any information and/or signals transmitted and/or received by transceivers of the system 2400, store any device and/or capability specifications relating to the earphone devices 2415, 2430, store historical data associated with the first and second users 2401, 2415, store information relating to the size (e.g. depth, height, width, curvatures, etc.) and/or shape of the first and/or second user's 2401, 2420 ear canals and/or ears, store information identifying and or describing any eartip utilized with the earphone devices 2401, 2415, store device characteristics for any of the devices in the system 2400, store information relating to any devices associated with the first and second users 2401, 2420, store any information associated with the earphone devices 2415, 2430, store log on sequences and/or authentication information for accessing any of the devices of the system 2400, store information associated with the communications networks 2416, 2431, store any information generated and/or processed by the system 2400, store any of the information disclosed for any of the operations and functions disclosed for the system 2400 herewith, store any information traversing the system 2400, or any combination thereof. Furthermore, the database 2455 may be configured to process queries sent to it by any device in the system 2400.

The system 2400 may also include a software application, which may be configured to perform and support the operative functions of the system 2400, such as the operative functions of the first, second, third, fourth, and fifth user devices 2402, 2406, 2410, 2421, 2425 and/or the earphone devices 2415, 2430. In certain embodiments, the application may be a website, a mobile application, a software application, or a combination thereof, which may be made accessible to users utilizing one or more computing devices, such as the first, second, third, fourth, and fifth user devices 2402, 2406, 2410, 2421, 2425 and/or the earphone devices 2415, 2430. The application of the system 2400 may be accessible via an internet connection established with a browser program or other application executing on the first, second, third, fourth, and fifth user devices 2402, 2406, 2410, 2421, 2425 and/or the earphone devices 2415, 2430, a mobile application executing on the first, second, third, fourth, and fifth user devices 2402, 2406, 2410, 2421, 2425 and/or the earphone devices 2415, 2430, or through other suitable means. Additionally, the application may allow users and computing devices to create accounts with the application and sign-in to the created accounts with authenticating username and password log-in combinations. The application may include a custom graphical user interface that the first user 2401 or second user 2420 may interact with by utilizing a browser executing on the first, second, third, fourth, and fifth user devices 2402, 2406, 2410, 2421, 2425 and/or the earphone devices 2415, 2430. In certain embodiments, the software application may execute directly as an installed program on the first, second, third, fourth, and fifth user devices 2402, 2406, 2410, 2421, 2425 and/or the earphone devices 2415, 2430.

Computing System for Facilitating the Operation and Functionality of the System

Figure 15:
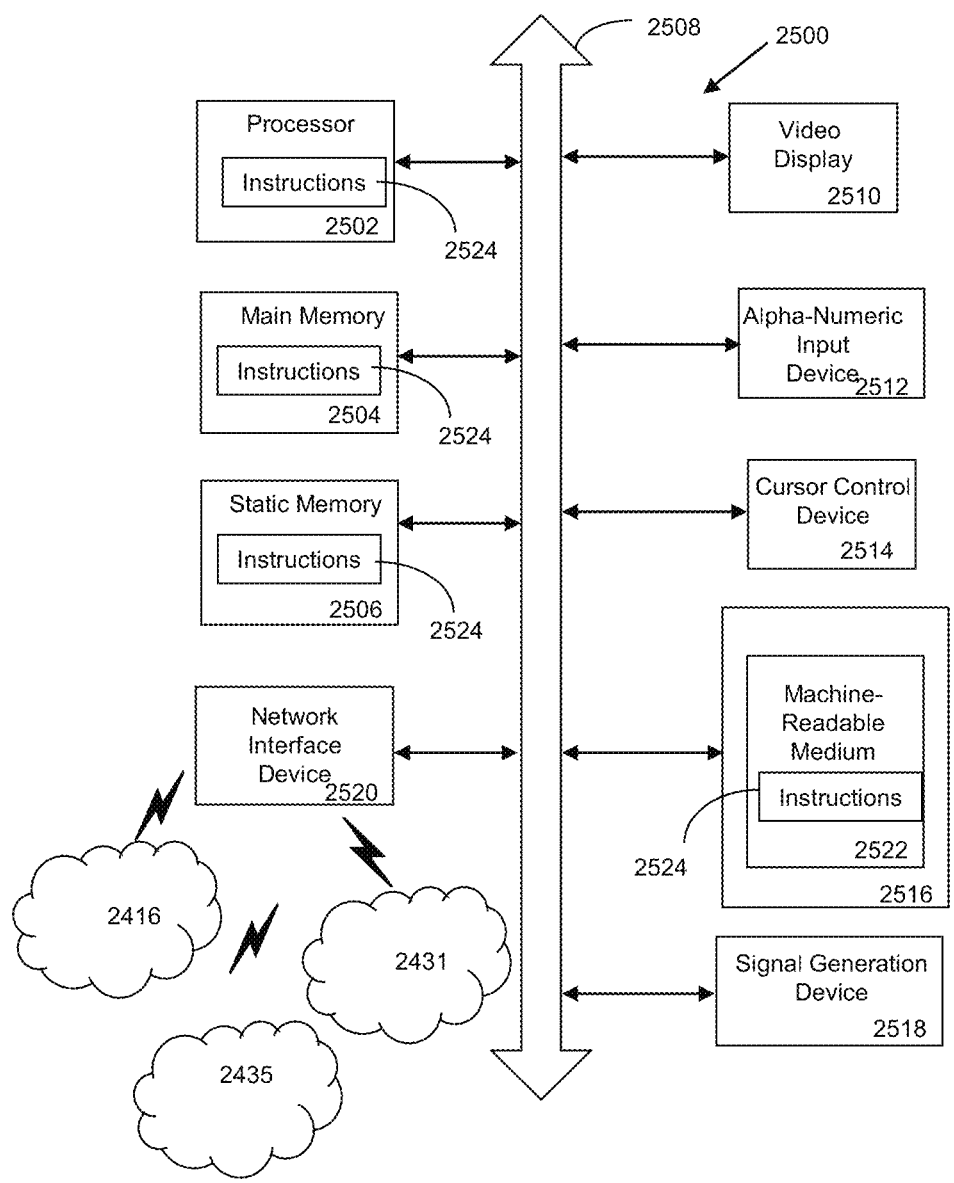
FIG. 15 is a schematic diagram of a machine in the form of a computer system which a set of instructions, when executed, may cause the machine to perform any one or more of the methodologies or operations of the systems and methods for utilizing an eartip according to embodiments of the present disclosure.

Referring now also to FIG. 15, at least a portion of the methodologies and techniques described with respect to the exemplary embodiments of the system 2400 can incorporate a machine, such as, but not limited to, computer system 2500, or other computing device within which a set of instructions, when executed, may cause the machine to perform any one or more of the methodologies or functions discussed above. The machine may be configured to facilitate various operations conducted by the system 2400. For example, the machine may be configured to, but is not limited to, assist the system 2400 by providing processing power to assist with processing loads experienced in the system 2400, by providing storage capacity for storing instructions or data traversing the system 2400, by providing functionality and/or programs for facilitating the operative functionality of the earphone devices 2415, 2430, and/or the first, second, third, fourth, and fifth user devices 2402, 2406, 2410, 2421, 2425 and/or the earphone devices 2415, 2430, by providing functionality and/or programs for facilitating operation of any of the components of the earphone devices 2415, 2430 (e.g. ear canal receivers, transceivers, ear canal microphones, ambient sound microphones, or by assisting with any other operations conducted by or within the system 2400.

In some embodiments, the machine may operate as a standalone device. In some embodiments, the machine may be connected (e.g., using communications network 2435, the communications network 2416, the communications network 2431, another network, or a combination thereof) to and assist with operations performed by other machines and systems, such as, but not limited to, the first user device 2402, the second user device 2411, the third user device 2410, the fourth user device 2421, the fifth user device 2425, the earphone device 2415, the earphone device 2430, the server 2440, the server 2450, the database 2455, the server 2460, or any combination thereof. The machine may be connected with any component in the system 2400. In a networked deployment, the machine may operate in the capacity of a server or a client user machine in a server-client user network environment, or as a peer machine in a peer-to-peer (or distributed) network environment. The machine may comprise a server computer, a client user computer, a personal computer (PC), a tablet PC, a laptop computer, a desktop computer, a control system, a network router, switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The computer system 2500 may include a processor 2502 (e.g., a central processing unit (CPU), a graphics processing unit (GPU, or both), a main memory 2504 and a static memory 2506, which communicate with each other via a bus 2508. The computer system 2500 may further include a video display unit 2510, which may be, but is not limited to, a liquid crystal display (LCD), a flat panel, a solid state display, or a cathode ray tube (CRT). The computer system 2500 may include an input device 2512, such as, but not limited to, a keyboard, a cursor control device 2514, such as, but not limited to, a mouse, a disk drive unit 2516, a signal generation device 2518, such as, but not limited to, a speaker or remote control, and a network interface device 2520.

The disk drive unit 2516 may include a machine-readable medium 2522 on which is stored one or more sets of instructions 2524, such as, but not limited to, software embodying any one or more of the methodologies or functions described herein, including those methods illustrated above. The instructions 2524 may also reside, completely or at least partially, within the main memory 2504, the static memory 2506, or within the processor 2502, or a combination thereof, during execution thereof by the computer system 2500. The main memory 2504 and the processor 2502 also may constitute machine-readable media.

Dedicated hardware implementations including, but not limited to, application specific integrated circuits, programmable logic arrays and other hardware devices can likewise be constructed to implement the methods described herein. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the present disclosure, the methods described herein are intended for operation as software programs running on a computer processor. Furthermore, software implementations can include, but not limited to, distributed processing or component/object distributed processing, parallel processing, or virtual machine processing can also be constructed to implement the methods described herein.

The present disclosure contemplates a machine-readable medium 2522 containing instructions 2524 so that a device connected to the communications network 2435, the communications network 2416, the communications network 2431, another network, or a combination thereof, can send or receive voice, video or data, and communicate over the communications network 2435, the communications network 2416, the communications network 2431, another network, or a combination thereof, using the instructions. The instructions 2524 may further be transmitted or received over the communications network 2435, another network, or a combination thereof, via the network interface device 2520.

While the machine-readable medium 2522 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that causes the machine to perform any one or more of the methodologies of the present disclosure.

The terms "machine-readable medium," "machine-readable device," or "computer-readable device" shall accordingly be taken to include, but not be limited to: memory devices, solid-state memories such as a memory card or other package that houses one or more read-only (non-volatile) memories, random access memories, or other re-writable (volatile) memories; magneto-optical or optical medium such as a disk or tape; or other self-contained information archive or set of archives is considered a distribution medium equivalent to a tangible storage medium. The "machine-readable medium," "machine-readable device," or "computer-readable device" may be non-transitory, and, in certain embodiments, may not include a wave or signal per se. Accordingly, the disclosure is considered to include any one or more of a machine-readable medium or a distribution medium, as listed herein and including art-recognized equivalents and successor media, in which the software implementations herein are stored.

The illustrations of arrangements described herein are intended to provide a general understanding of the structure of various embodiments, and they are not intended to serve as a complete description of all the elements and features of apparatus and systems that might make use of the structures described herein. Other arrangements may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Thus, although specific arrangements have been illustrated and described herein, it should be appreciated that any arrangement calculated to achieve the same purpose may be substituted for the specific arrangement shown. This disclosure is intended to cover any and all adaptations or variations of various embodiments and arrangements of the invention. Combinations of the above arrangements, and other arrangements not specifically described herein, will be apparent to those of skill in the art upon reviewing the above description. Therefore, it is intended that the disclosure not be limited to the particular arrangement(s) disclosed as the best mode contemplated for carrying out this invention, but that the invention will include all embodiments and arrangements falling within the scope of the appended claims.

The foregoing is provided for purposes of illustrating, explaining, and describing embodiments of this invention. Modifications and adaptations to these embodiments will be apparent to those skilled in the art and may be made without departing from the scope or spirit of this invention. Upon reviewing the aforementioned embodiments, it would be evident to an artisan with ordinary skill in the art that said embodiments can be modified, reduced, or enhanced without departing from the scope and spirit of the claims described below.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions of the relevant exemplary embodiments. For example, if words such as "orthogonal", "perpendicular" are used, the intended meaning is "substantially orthogonal" and "substantially perpendicular" respectively. Additionally, although specific numbers may be quoted in the claims, it is intended that a number close to the one stated is also within the intended scope, i.e. any stated number (e.g., 20 mils) should be interpreted to be "about" the value of the stated number (e.g., about 20 mils).

Thus, the description of the invention is merely exemplary in nature and, thus, variations that do not depart from the gist of the invention are intended to be within the scope of the exemplary embodiments of the present invention. Such variations are not to be regarded as a departure from the spirit and scope of the present invention.

The Abstract of the Disclosure is provided to comply with 37 C.P.R.§ 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method of contact tracking comprising:
   identifying whether a distance from a first device to a second device is less than a threshold value;
   obtaining a contact time of when the distance was less than the threshold value;
   obtaining contact information and location information of the first device at the contact time;
   adding the contact and location information and the contact time to a contact list, where the contact list is stored in computer memory of the second device; and
   measuring an acoustic environment about the second device for a time segment, where the contact time is within the time segment, and wherein the second device does the measuring.

2. The method according to claim 1, further including the step of:
   obtaining second location information from the second device.

3. The method according to claim 2, further including the step of:
   time matching the location information with the second location information.

4. The method according to claim 3, wherein the step of identifying whether the distance is less than the threshold value is accomplished by calculating the difference between the location information and the second location information and checking if the difference is less than the threshold value.

5. The method according to claim 4, further including the step of:
   setting a positive notification value if the distance is less than the threshold value.

6. The method according to claim 4, further including the step of:
   setting a negative notification value if the distance is not less than the threshold value.

7. The method according to claim 5, further including the step of:
   sending a positive notification signal.

8. The method according to claim 7, further including the step of:
   sending a notification message to the second device.

9. The method according to claim 4, where the second device is at least one of an earphone, a phone, or a computer.

10. The method according to claim 9, where the threshold value is between 1 ft and 30 ft.

11. The method according to claim 10, further including the step of:
    obtaining acoustic information from the measured acoustic environment.

12. The method according to claim 11, further including the step of:
    identifying an acoustic segment of the acoustic information within a time of interest.

13. The method according to claim 12, further including the step of:
    obtaining acoustic characteristics of the acoustic segment.

14. The method according to claim 13, further including the step of:
    comparing the acoustic characteristics with stored voiceprints to identify contact information associated with the first device.

15. The method according to claim 14, further including the step of:
    sending the contact list wirelessly to a computer.

* * * * *